(12) United States Patent
Shinmei et al.

(10) Patent No.: US 7,853,099 B2
(45) Date of Patent: Dec. 14, 2010

(54) INFORMATION PROCESSING APPARATUS, INFORMATION PROCESSING METHOD, LEARNING APPARATUS AND LEARNING METHOD AND PROGRAM

(75) Inventors: Katsuhisa Shinmei, Kanagawa (JP); Kenji Takahashi, Kanagawa (JP); Tsutomu Ichikawa, Kanagawa (JP); Takashi Sawao, Tokyo (JP); Koji Yano, Tokyo (JP); Toshinobu Sugiyama, Kanagawa (JP); Akihiro Okumura, Kanagawa (JP); Takao Inoue, Kanagawa (JP); Noriaki Takahashi, Tokyo (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 1019 days.

(21) Appl. No.: 11/617,945

(22) Filed: Dec. 29, 2006

(65) Prior Publication Data

US 2007/0165112 A1 Jul. 19, 2007

(30) Foreign Application Priority Data

Jan. 16, 2006 (JP) ............................. 2006-007257

(51) Int. Cl.
*G06K 9/54* (2006.01)
*G06K 9/40* (2006.01)
*H04N 5/228* (2006.01)

(52) U.S. Cl. ..................... 382/305; 382/275; 348/222.1

(58) Field of Classification Search ................. 382/305, 382/312, 165, 291, 254, 224, 262, 275; 348/247, 348/243, 275, 280, 222.1
See application file for complete search history.

(56) References Cited

U.S. PATENT DOCUMENTS

| 6,081,343 | A | * | 6/2000 | Terashita | ..................... 358/1.9 |
| 6,636,635 | B2 | * | 10/2003 | Matsugu | ..................... 382/218 |
| 7,116,816 | B2 | * | 10/2006 | Tanaka et al. | ............... 382/149 |
| 7,145,599 | B2 | * | 12/2006 | Takeda | ......................... 348/247 |
| 2006/0017395 | A1 | * | 1/2006 | Liao et al. | ................. 315/169.3 |
| 2006/0226865 | A1 | * | 10/2006 | Gallarda et al. | ............. 324/770 |

* cited by examiner

*Primary Examiner*—Yon Couso
(74) *Attorney, Agent, or Firm*—Oblon, Spivak, McClelland, Maier & Neustadt, L.L.P.

(57) ABSTRACT

An information processing apparatus includes an image taking means for taking images of a subject, a class-classification means for classifying a first image outputted by the image taking means into a class according to a characteristics thereof, a storage means for storing plural coefficient memories having different image taking conditions at the time of image taking, which store prediction coefficients according to the class acquired by learning, a designation means for designating one coefficient memory from among the plural coefficient memories based on the image taking condition when the image was taken by the image taking means, and a calculation means for calculating a second image in which noise is removed from the first image by calculating a prediction coefficient of the class of the first image, which is in the designated coefficient memory.

15 Claims, 25 Drawing Sheets

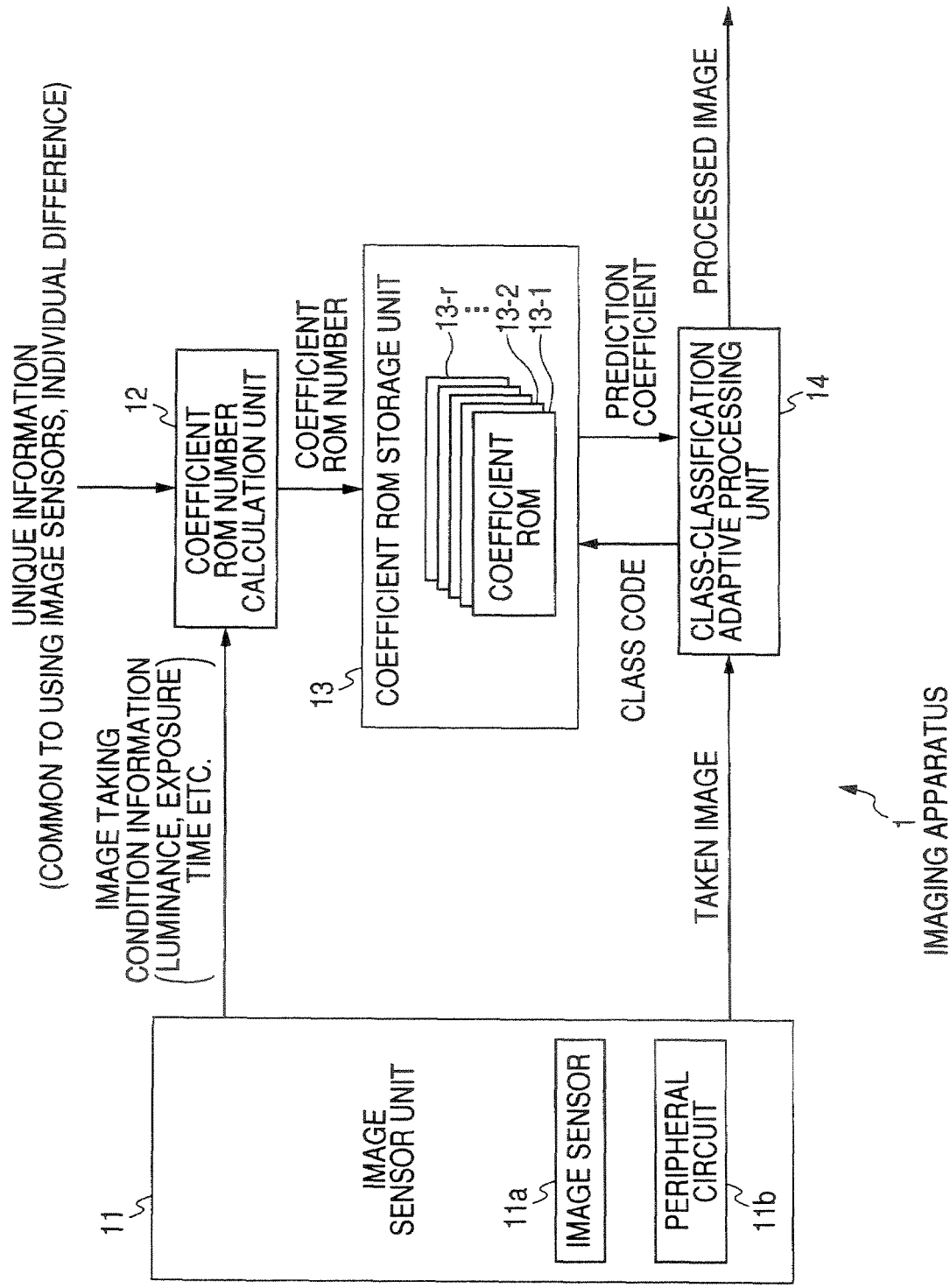

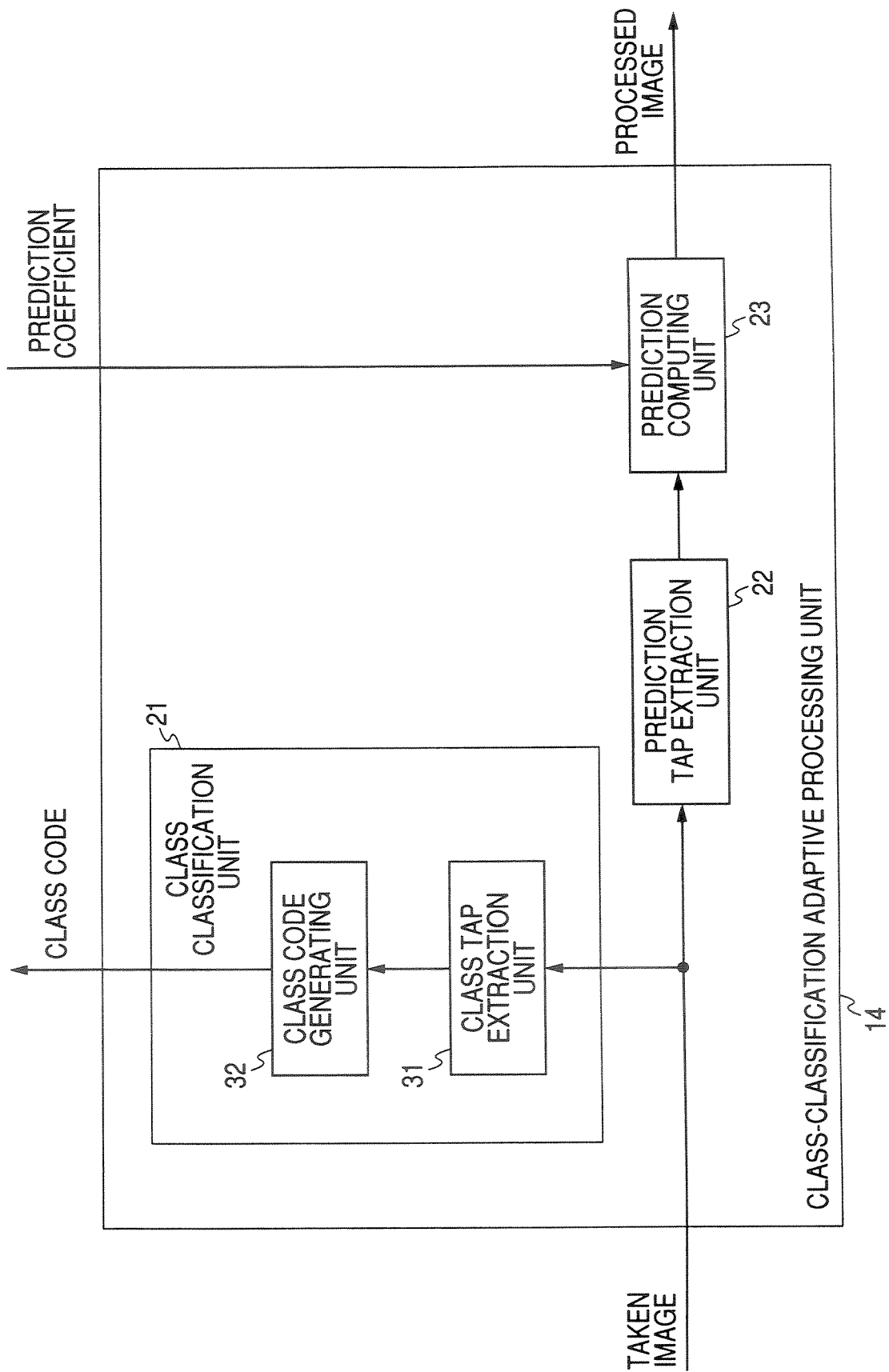

CLASS TAP EXAMPLE (CROSS 9-TAP)

PIXEL CORRESPONDING TO FOCUSED PIXEL

PREDICTION TAP EXAMPLE

PIXEL CORRESPONDING TO FOCUSED PIXEL

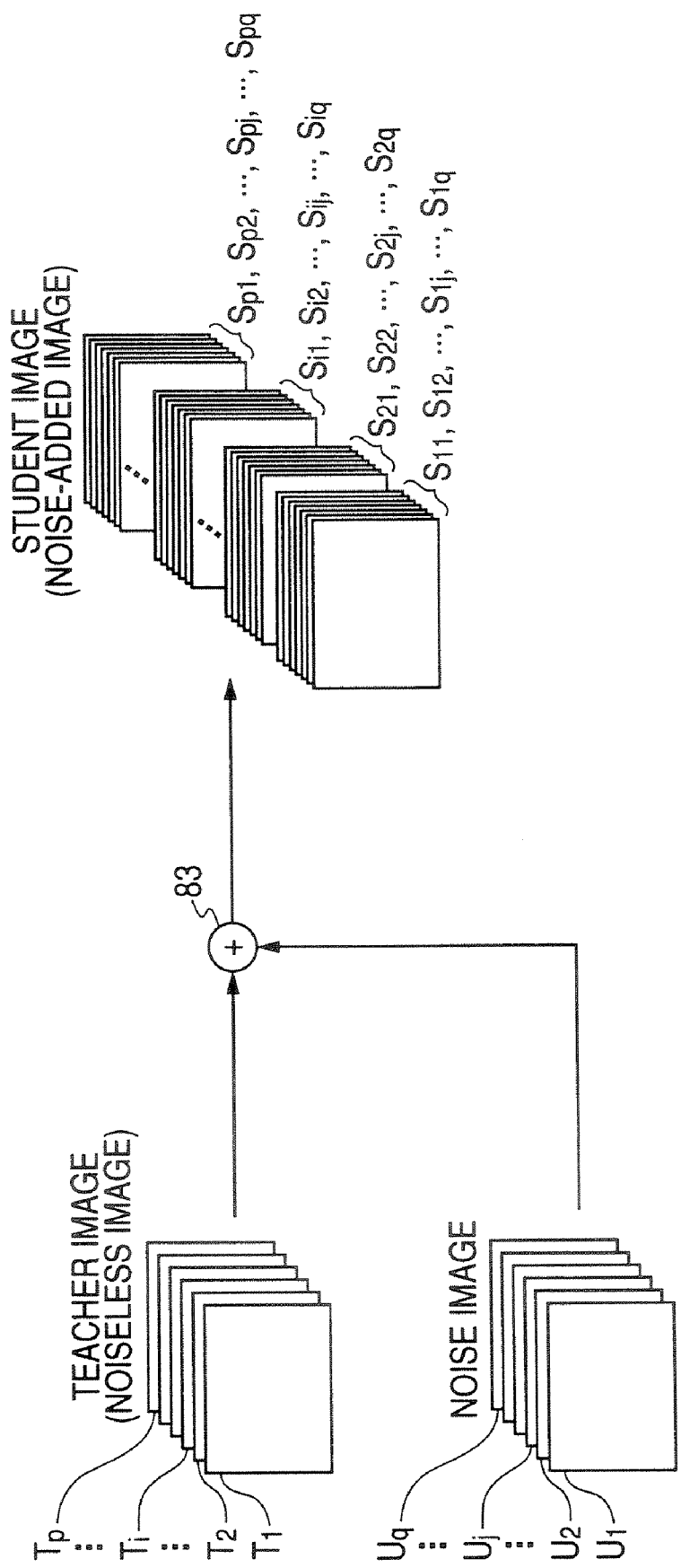

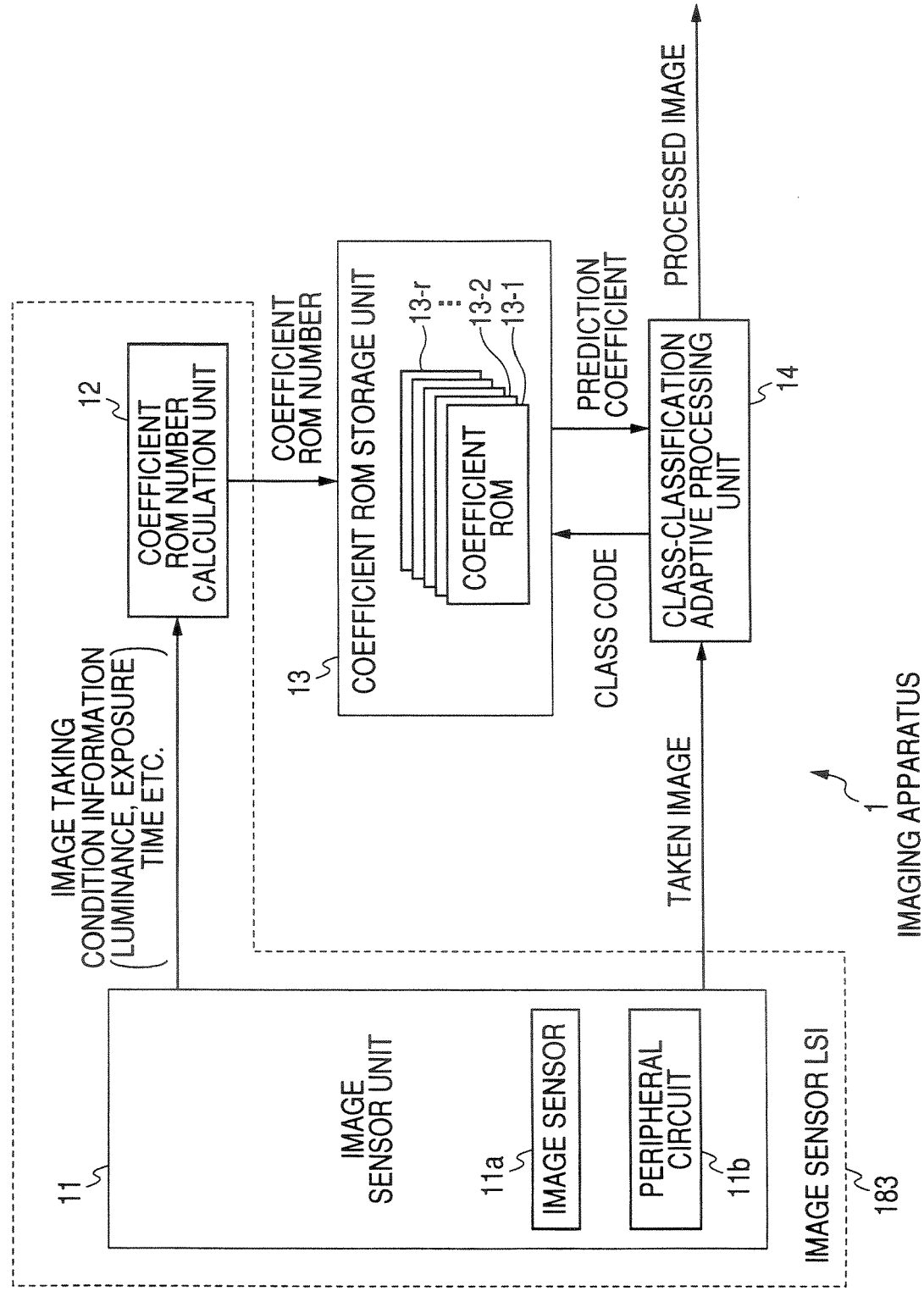

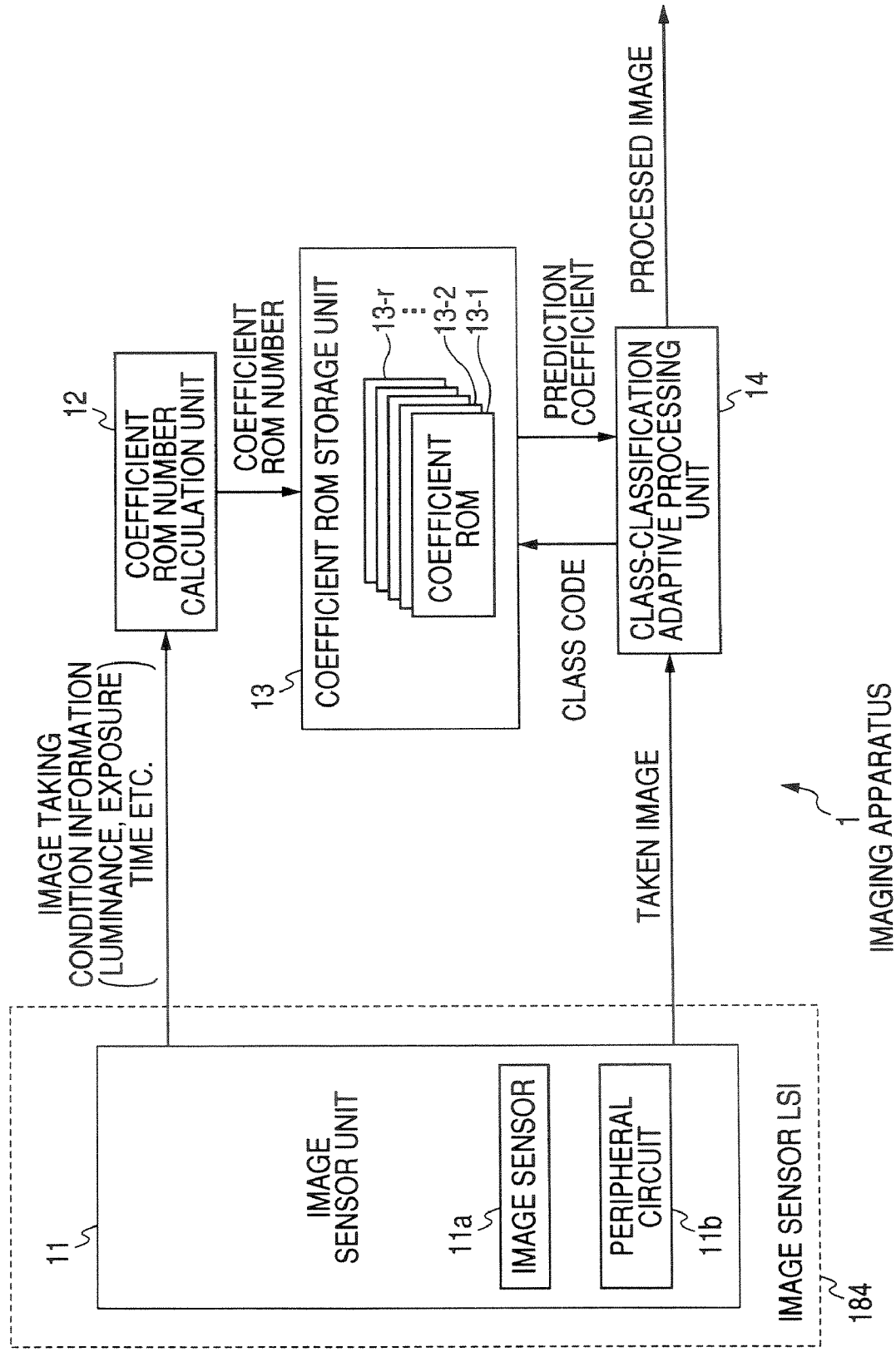

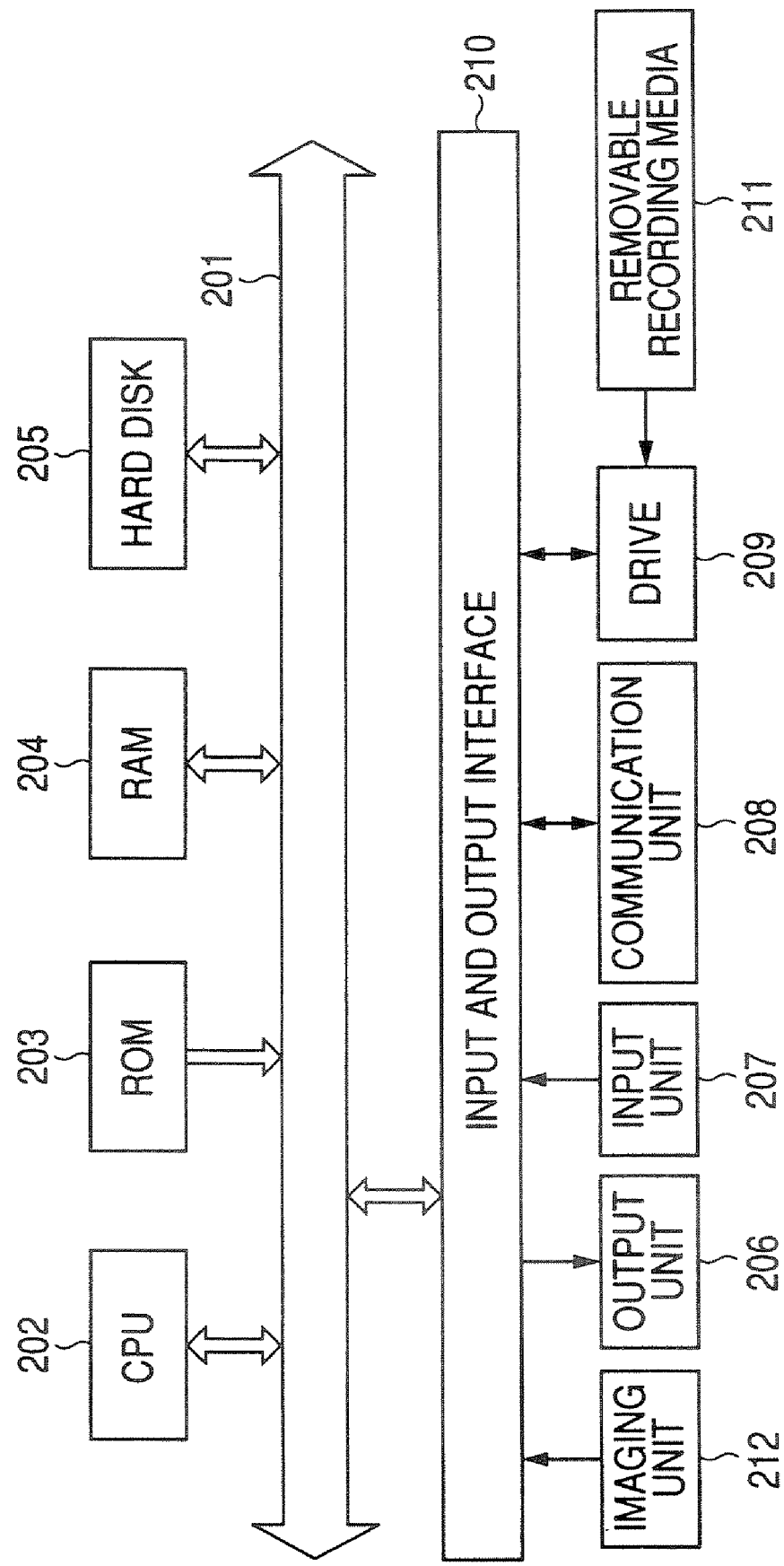

INFORMATION PROCESSING APPARATUS, INFORMATION PROCESSING METHOD, LEARNING APPARATUS AND LEARNING METHOD AND PROGRAM

CROSS REFERENCE TO RELATED APPLICATIONS

The present invention contains subject matter related to Japanese Patent Application JP 2006-007257 filed in the Japanese Patent Office on Jan. 16, 2006, the entire contents of which being incorporated herein by reference.

BACKGROUND OF THE INVENTION

1. Field of the Invention

The invention relates to an information processing apparatus, an information processing method, a learning apparatus, a learning method and a program, particularly, relates to the information processing apparatus, the information processing method, the learning apparatus, the learning method and the program capable of accurately removing noise included in images taken by an imaging sensor.

2. Description of the Related Art

The present inventor has proposed class-classification adaptive processing before (for example, refer to JP-A-2002-218414 (Patent document 1)). The class-classification adaptive processing is signal processing which calculates a linear primary formula of pixel values of plural pixels in a prescribed area of an inputted first image and a prediction coefficient calculated in advance by learning processing using teacher images and student images, and thereby calculating second image signals by the inputted first image.

When the first image is an image including noise and the second image is an image from which noise is removed (reduced), the class-classification adaptive processing functions as noise removal processing. When the first image is a SD (Standard Definition) image and the second image is a HD (High Definition) image which has higher resolution than the SD image, the class-classification adaptive processing functions as resolution conversion processing which converts the low-resolution image to the high-resolution image.

In the class-classification adaptive processing disclosed in Patent document 1, the degree of removing noise (noise removal degree) in the noise removal processing or resolution after the conversion in the resolution conversion processing (horizontal resolution and vertical resolution are designated by a user himself by operating a joy stick and the like, and the above prediction coefficient can be changed according to the designated value.

In related arts, in the noise removal processing using the class-classification adaptive processing, an image (signal) received by a tuner and the like or an image (signal) played back from a recording and playback device is made to be the first image, and weak-electric field noise generated at the time of transmission or compression, or noise due to compression distortion are considered as noise to be removed from the first image.

In images obtained by being taken (picked up) by image sensors such as a CCD (Charge Coupled Device) sensor or a CMOS (Complementary Metal Oxide Semiconductor) sensor, there are noise having characteristics (noise characteristics) varying according to luminance or exposure time when taking images.

For example, concerning the relation (characteristic) between the noise amount (level) included in an image taken by the image sensor and exposure time when taking images, the longer the exposure time, the larger the noise amount becomes as shown in FIG. 1, therefore, a S/N ratio which is a ratio between a signal and noise decreases as the exposure becomes long. In addition, the relation between luminance (brightness) when taking images and the S/N ratio, the lower the luminance when taking images, the lower the S/N ratio becomes, as shown in FIG. 2.

SUMMARY OF THE INVENTION

As described above, as noise included in images taken by the image sensor, there are noise whose types are different from weak-electric field noise generated at the time of transmission or compression, or noise due to compression distortion, and it is difficult to sufficiently remove the above noise by noise removal processing using the class-classification adaptive processing of the related art.

In view of the above, it is desirable to remove noise included in images taken by the image sensor more accurately.

According to an embodiment of the invention, an information processing apparatus includes an image taking means for taking images of a subject, a class-classification means for classifying a first image outputted by the image taking means into a class according to a characteristic thereof, a storage means for storing plural coefficient memories having different image taking conditions at the time of image taking, storing prediction coefficients according to class acquired by learning, a designation means for designating one coefficient memory from among the plural coefficient memories based on the image taking condition when the image was taken by the image taking means, and a calculation means for calculating a second image in which noise is removed from the first image by calculating using a prediction coefficient of the class of the first image, which is in the designated coefficient memory.

The image taking condition may be luminance or exposure time at the time of image taking.

The storage means can further store coefficient memories according to the image taking condition at the time of image taking and unique information unique to the image taking means, and the designated means can designate one coefficient memory from among the stored plural coefficient memories based on the image taking condition and the unique information.

The storage means can further store coefficient memories according to the image taking condition and defect position information indicating a position of a defective pixel in pixels included in the image taking means, the designation means can designate one coefficient memory from among the stored plural coefficient memories based on the image taking condition and the defect position information, and the calculation means can correct the defective pixels and calculate the second image in which noise is removed from the first image.

The information processing apparatus can further include a defective pixel detection means for detecting a defective pixel of the image taking means and outputting defect position information, and a storage means for storing the defect position information The defective pixel detection means can detect the defective pixel base on whether corresponding respective pixels of two images taken at different times have the same pixel value or not.

All components of the image taking means, the class-classification means, the storage means, the designation means, and the calculation means, or a part of the above components including at least the image taking means are configured by a chip.

An information processing method according to an embodiment of the invention includes the steps of classifying a first image obtained by taking images of a subject into a class according to a characteristic thereof, designating one coefficient memory from among plural coefficient memories having different image taking conditions at the time of image taking, which store prediction coefficients according the class obtained by learning, based on the image taking condition when the first image was obtained, and calculating a second image in which noise is removed from the first image by calculating using a prediction coefficient of the class of the first image, which is in the designated coefficient memory.

A program according to an embodiment of the invention allows a computer to execute the steps of classifying a first image obtained by taking images of a subject into a class according to a characteristic thereof, designating one coefficient memory from among plural coefficient memories having different image taking conditions at the time of image taking, which store prediction coefficients according the class obtained by learning based on the image taking condition when the first image was obtained, and calculating a second image in which noise is removed from the first image by calculating using a prediction coefficient of the class of the first image, which is in the designated coefficient memory.

In an embodiment of the invention, the first image obtained by taking images of a subject is classified into a class according to a characteristic thereof, and one coefficient memory is designated from among plural coefficient memories having different image taking conditions at the time of image taking, which store prediction coefficients according the class obtained by learning based on image taking condition when the first image was obtained. Then, a second image is calculated in which noise is removed from the first image by calculating using the coefficient of the class of the first image in the designated coefficient memory.

A learning apparatus according to an embodiment of the invention is a learning apparatus for learning a prediction coefficient used when performing noise removal processing of an taken image which is the taken image, including a condition decision means for deciding image taking condition, an image taking means for taking images of a subject under the decided image taking condition, a noise image generating means for generating a noise image in which noise included in the image taken by the image taking means is extracted, a teacher image generating means for generating a teacher image to be a target image after the noise removal processing, a student image generating means for generating a student image corresponding to the taken image before the noise removal processing is performed by adding the noise image to the teacher image, and a storage means for storing data of pairs of the teacher image and the student image according to different image taking conditions.

The learning apparatus according to an embodiment of the invention further includes an extraction means for extracting plural pixels used for calculating a focused pixel which is a pixel of the teacher image from the student image with respect to respective image taking conditions, and a calculation means for calculating a prediction coefficient which allows a prediction error of the focused pixel calculated by using the prediction coefficient to be statistically minimum based on the extracted plural pixels.

The noise image generating means can generate plural noise images by calculating the difference between an image which is an average value of plural images taken by the image taking means and respective plural images taken by the image taking means.

A learning method according to an embodiment of the invention which is a learning method for learning a prediction coefficient used for performing noise removal processing of a taken image which is the taken image, including the steps of deciding the image taking condition, taking images of a subject under the decided image taking condition, generating a noise image in which noise included in the taken image is extracted, generating a teacher image to be a target image after noise removal processing, generating a student image corresponding to the taken image before the noise removal processing is performed by adding the noise image to the teacher image, and storing data of pairs of the teacher image and the student image according to different image taking conditions.

A program according to an embodiment of the invention is a program allowing a computer to execute processing of learning a prediction coefficient used for performing noise removal processing of a taken image which is the taken image, including the steps of deciding the image taking condition, taking images of a subject under the decided image taking condition, generating a noise image in which noise included in the taken image is extracted, generating a teacher image to be a target image after noise removal processing, generating a student image corresponding to the taken image before the noise removal processing is performed by adding the noise image to the teacher image, and storing data of pairs of the teacher image and the student image according to different image taking conditions.

According to an embodiment of the invention, images of a subject is taken under the decided image taking condition and a noise image in which noise included in the taken image is extracted is generated. A teacher image to be a target image after the noise removal processing is generated, and a student image corresponding to the taken image before the noise removal processing is performed is generated by adding the noise image to the generated teacher image. Then, data of pairs of the teacher image and the student image is stored according to different image taking conditions.

According to the invention, noise included in images taken by an image sensor can be removed more positively.

BRIEF DESCRIPTION OF THE DRAWINGS

FIG. 3 is a block diagram showing a configuration example of an embodiment of an imaging apparatus to which the invention is applied;

FIG. 4 is a block diagram showing the detailed configuration example of a class-classification adaptive processing unit of FIG. 3;

FIG. 12 is a view explaining generation of learning data;

FIG. 24 is a block diagram explaining a configuration example of a chip in the imaging apparatus of FIG. 3;

FIG. 25 is a block diagram explaining a configuration example of a chip in the imaging apparatus of FIG. 3; and FIG. 26 is a block diagram showing a configuration example of an embodiment of a computer to which the invention is applied.

DESCRIPTION OF THE PREFERRED EMBODIMENTS

Figure 1:
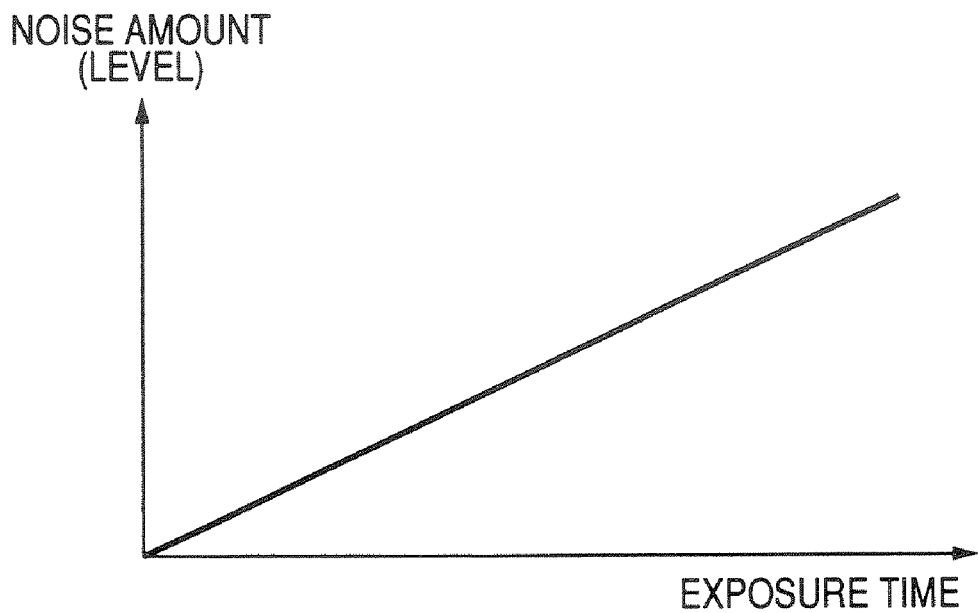
FIG. 1 is a graph showing the relation between exposure time and the noise amount.
Figure 2:
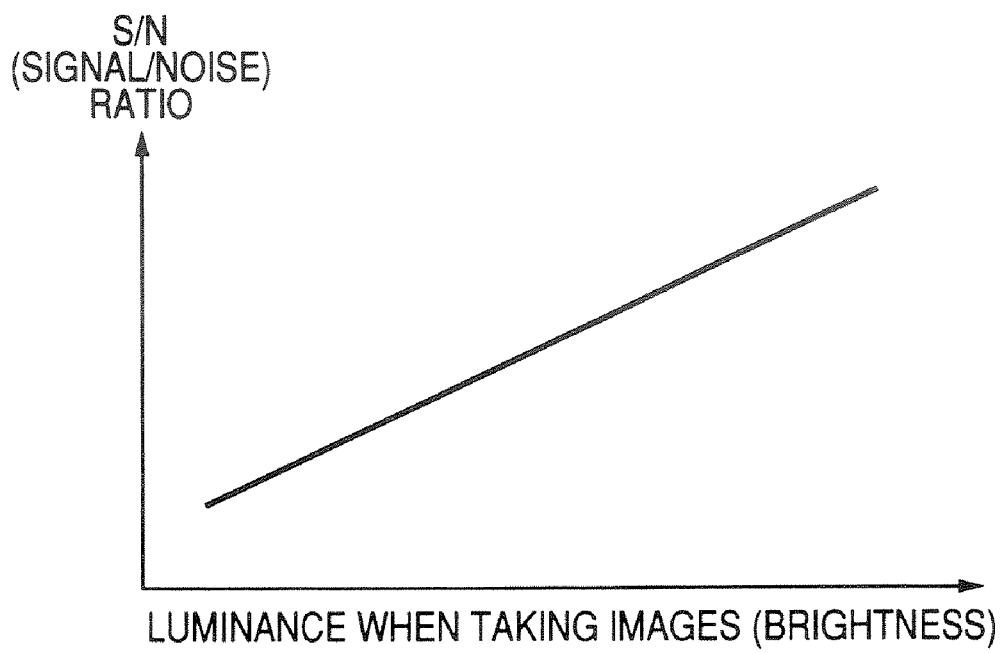
FIG. 2 is a graph showing the relation between luminance when taking images and an S/N ratio.

Hereinafter, embodiments of the invention will be explained. The correspondence between constituent features of the invention and embodiments described in detailed description of the invention is exemplified as follows. The description is made for confirming that embodiments which support the invention are written in the detailed description of the invention. Therefore, if there is an embodiment that is written in the detailed description of the invention but not written here as the embodiment corresponding to a constituent feature of the invention, that does not mean that the embodiment does not correspond to the constituent feature. Conversely, if an embodiment is written here as the embodiment corresponding to a constituent feature, that does not mean that the embodiment does not correspond to a constituent feature other than that constituent feature.

An information processing apparatus (for example, an imaging apparatus in FIG. 3) according to an embodiment of the invention includes an image taking means (for example, an image sensor unit 11 in FIG. 3) for taking images of a subject, a class-classification means (for example, a class classification unit 21 in FIG. 4) for classifying a first image outputted by the image taking means into a class according to a characteristic thereof, a storage means (for example, a coefficient ROM storage unit 13 in FIG. 3) for storing plural coefficient memories having different image taking conditions at the time of image taking, which store prediction coefficients according to class acquired by learning, a designation means (for example, a coefficient ROM number calculation unit 12 in FIG. 3) for designating one coefficient memory from among the plural coefficient memories based on the image taking condition when the image was taken by the image taking means, and a calculation means (for example, a prediction calculation unit 23 in FIG. 4) for calculating a second image in which noise is removed from the first image by calculating using a prediction coefficient of the class of the first image, which is in the designated coefficient memory.

The information processing apparatus according to an embodiment of the invention further includes a defective pixel detection means (for example, a defect detection unit 142 in FIG. 21) for detecting a defective pixel of the image taking means and outputting defect position information, and a storage means (for example, a defect information nonvolatile memory 141) for storing the defect position information.

In the information processing apparatus according to an embodiment of the invention, all components of the image taking means, the class-classification means, the storage means, the designation means, and the calculation means, or a part of the above components including at least the image taking means are configured by a chip (for example, image sensor LSIs 181 to 184 of FIG. 22 to FIG. 25.)

Figure 6:
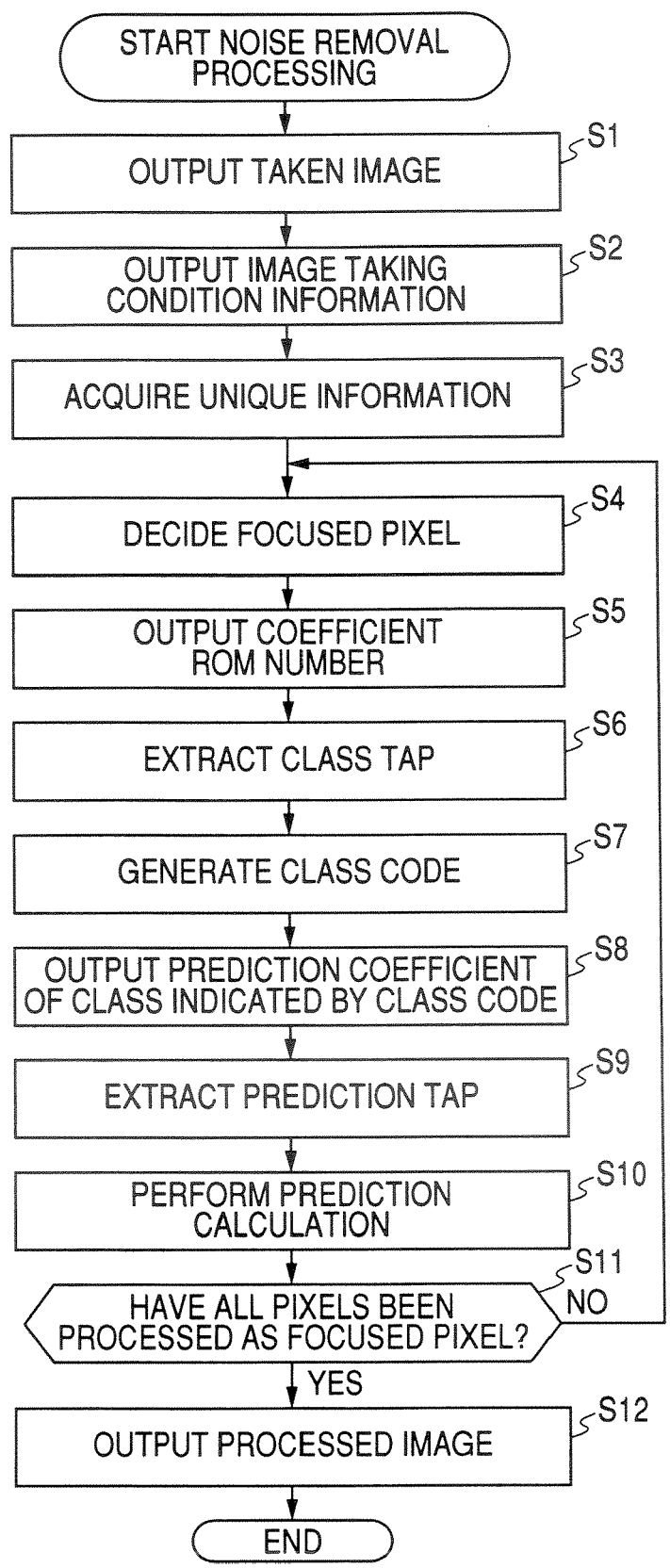
FIG. 6 is a flowchart explaining the noise removal processing of the imaging apparatus of FIG. 3.

An information processing method according to an embodiment of the invention (for example, a noise removal processing method in FIG. 6) includes the steps of classifying a first image obtained by taking images of a subject into a class according to a characteristic thereof (for example, step S7 in FIG. 6), designating one coefficient memory from among plural coefficient memories having different image taking conditions at the time of image taking, which store prediction coefficients according the class obtained by learning, based on the image taking condition when the first image was obtained (for example, step S5 in FIG. 6), and calculating a second image in which noise is removed from the first image by calculating using a prediction coefficient of the class of the first image, which is in the designated coefficient memory (for example, step S10 in FIG. 6).

A learning apparatus according to an embodiment of the invention is a learning apparatus (for example, a learning apparatus 51 in FIG. 7) which learns a prediction coefficient used when performing noise removal processing of an taken image which is the taken image, including a condition decision means (for example, a image taking condition decision unit 91 in FIG. 9) for deciding an image taking condition, an image taking means (for example, taken image generating means 92 in FIG. 9) for taking images of a subject under the decided image taking condition, a noise image generating means (for example, a difference calculating unit 94 in FIG. 9) for generating a noise image in which noise included in the image taken by the image taking means is extracted, a teacher image generating means (for example, a teacher image generating unit 81 in FIG. 8) for generating a teacher image to be a target image after the noise removal processing, a student image generating means (for example, a noise adding unit 83 in FIG. 8) for generating a student image corresponding to the taken images before the noise removal processing is performed by adding the noise image to the teacher image, and a storage means (for example, a learning pair database 62 in FIG. 7) for storing data of pairs of the teacher image and the student image according to different image taking conditions.

Figure 7:
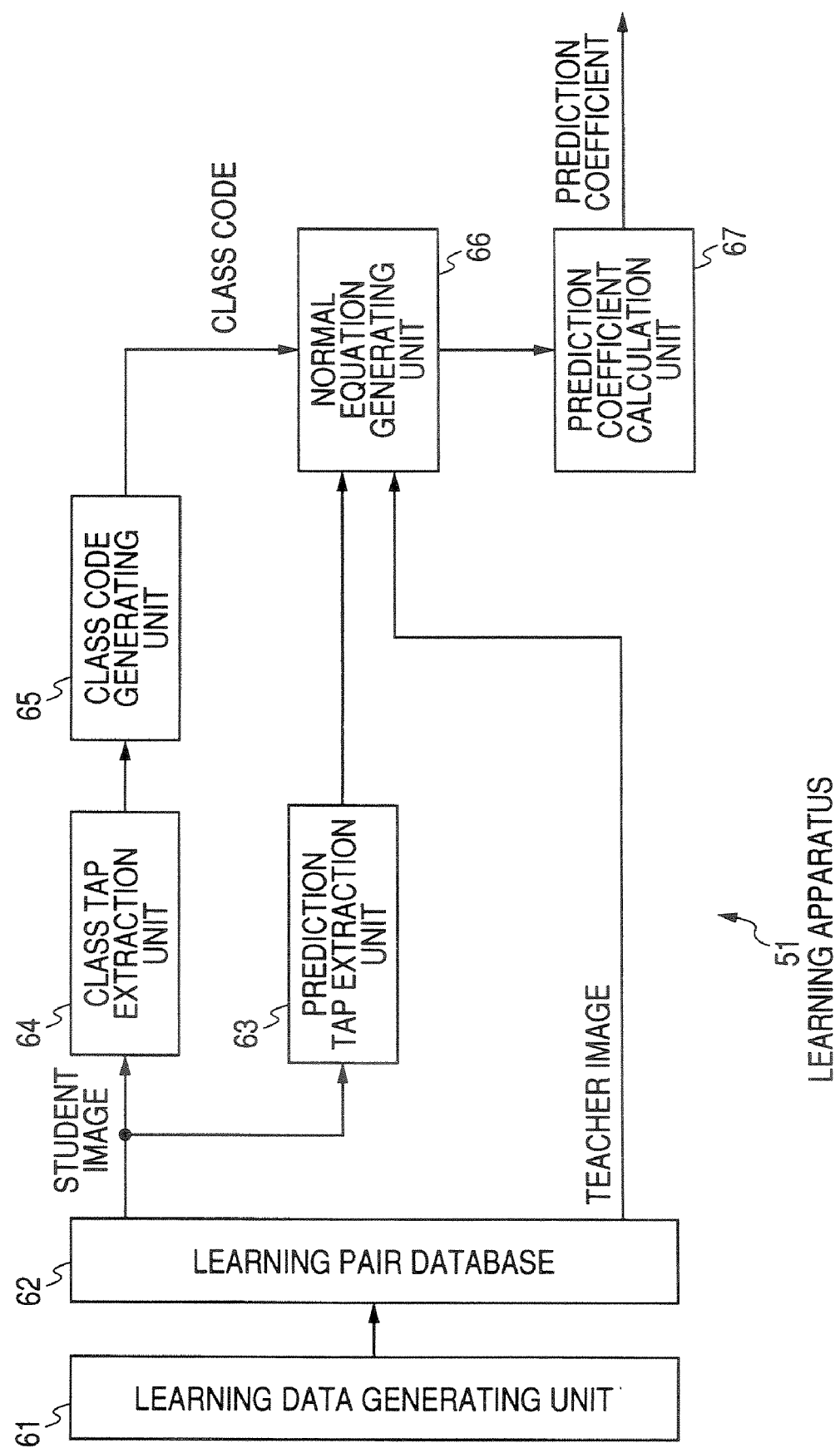
FIG. 7 is a block diagram showing a configuration example of a learning apparatus which calculates a prediction coefficient.

The learning apparatus according to an embodiment of the invention further includes an extraction means (for example, a prediction tap extraction unit 63 in FIG. 7) for extracting plural pixels used for calculating a focused pixel which is a pixel of the teacher image from the student image with respect to respective image taking conditions, and a calculation means (for example, a prediction coefficient calculation unit 67 in FIG. 7) for calculating a prediction coefficient which allows a prediction error of the focused pixel calculated by using the prediction coefficient to be statistically minimum based on the extracted plural pixels.

Figure 14:
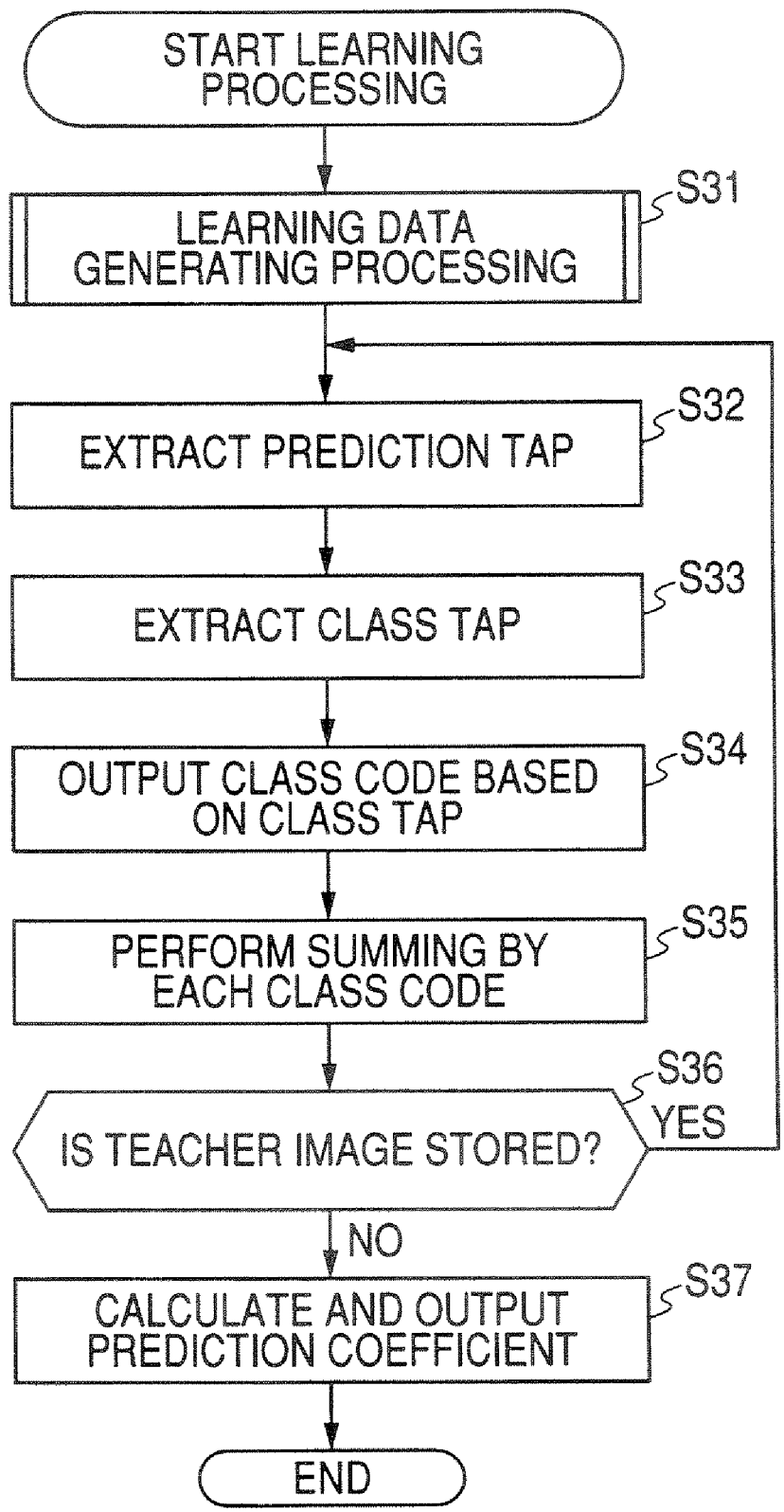
FIG. 14 is a flowchart explaining learning processing of the learning apparatus of FIG. 7.
Figure 15:
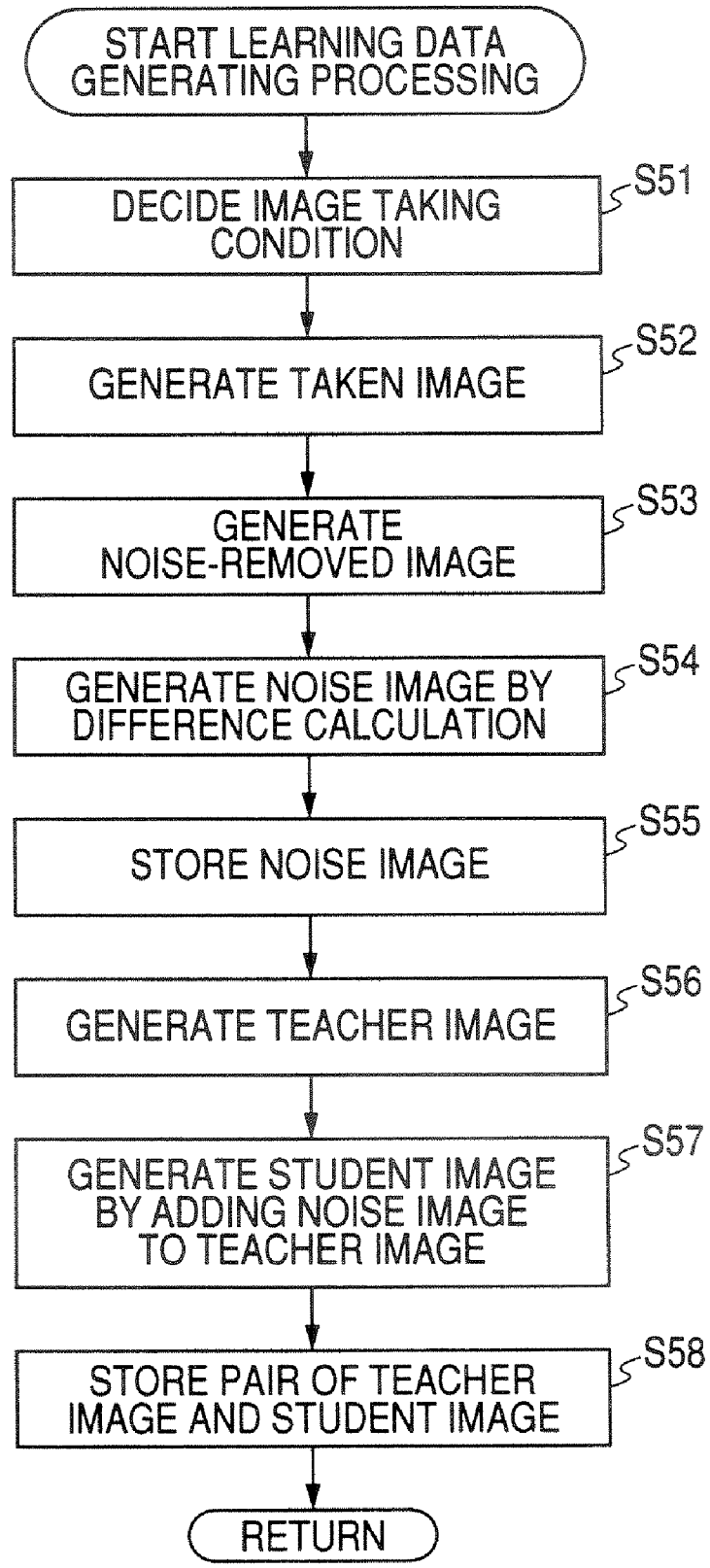
FIG. 15 is a flowchart explaining learning data generating processing of step S31 of FIG. 14.

A learning method according to an embodiment of the invention which is a learning method (for example, a learning processing method in FIG. 14) which learns a prediction coefficient used for performing noise removal processing of the taken image which is the taken image, includes the steps of deciding the image taking condition (for example, step S51 in FIG. 15), taking images of a subject under the decided image taking condition (for example, step S52 in FIG. 15), generating a noise image in which noise included in the taken image is extracted (for example, step S54 in FIG. 15), generating a teacher image to be a target image after noise removal processing (for example, step S56 in FIG. 15), generating a student images corresponding to the taken image before the noise removal processing is performed by adding the noise image to the teacher image (for example, step S57 in FIG. 15), and storing data of pairs of the teacher image and the student image according to different image taking conditions (for example, step S58 in FIG. 15).

Hereinafter, embodiments of the invention will be explained with reference to the drawings.

FIG. 3 shows a configuration example of a first embodiment of an imaging apparatus to which the invention is applied.

An imaging apparatus 1 in FIG. 3 includes an image sensor unit 11, a coefficient ROM number calculation unit 12, a coefficient ROM storage unit 13, and a class-classification adaptive processing unit 14. The coefficient ROM storage unit 13 stores r ($r \geq 1$) pieces of coefficient ROMs 13-1 to 13-$r$. It is preferable to store the coefficient ROMs 13-1 to 13-$r$ as coefficient memories physically independent from one another, or to store them by forming them in different address spaces in one memory. The imaging apparatus 1 is mounted on a digital video camera, a digital still camera, a cellular phone and the like.

The image sensor unit 11 includes at least an image sensor 11$a$ having a CCD sensor or a CMOS sensor which converts light (optical signal) from a subject into an electric charge (electric signal), and a peripheral circuit 11$b$ for amplifying or reading the electric signal outputted from the image sensor 11$a$. The image sensor 11$a$ corresponds to a pixel forming an image, and plural image sensors 11$a$ are disposed on an array to from a sensor array in the image sensor unit 11.

The image sensor unit 11 outputs a taken image obtained by taking (picking up) the subject to the class-classification adaptive processing unit 14. In the embodiment, to output the image means to output image signals forming the image. The image sensor unit 11 also outputs image taking condition information indicating an image taking condition of the taken image outputted to the class-classification adaptive processing unit 14 to the coefficient ROM number calculation unit 12. The image taking condition information is information about conditions varying at each image taking, such as luminance or exposure time of a subject.

To the coefficient ROM number calculation unit 12, the image taking condition information is supplied from the image sensor unit 11 as well as unique information of the image sensor 11$a$ is supplied thereto from an operation unit or a communication unit which are not shown. The unique information is information fixed to the image sensor 11$a$ not varying at every image taking, for example, information indicating characteristics existing common to image sensors which are the same type number as the image sensor 11$a$ or information indicating characteristics (individual difference) of the image sensor 11$a$ itself.

The coefficient ROM number calculation unit 12 designates an optimum coefficient ROM from among the coefficient ROMs 13-1 to 13-$r$ in the coefficient ROM storage unit 13 based on the image taking condition information and the unique information. Specifically, the coefficient ROM number calculation unit 12 designate the optimum coefficient ROM with respect to the coefficient ROM storage unit 13 by outputting the coefficient ROM number given to each of the coefficient ROMs 13-1 to 13-$r$ to the coefficient ROM storage unit 13.

Respective the coefficient ROMs 13-1 to 13-$r$ in the coefficient ROM storage unit 13 store prediction coefficients for removing noise according to classes, which have been calculated by learning described later with reference to FIG. 7. The coefficient ROMs 13-1 to 13-$r$ have different image taking condition information or the unique information when the prediction coefficient was calculated.

The coefficient ROM storage unit 13 selects any of the coefficient ROMs 13-1 to 13-$r$ corresponding to a coefficient ROM number supplied from the coefficient ROM number calculation unit 12. The coefficient ROM storage unit 13 also acquires a prediction coefficient of a class indicated by a class code supplied from the class-classification adaptive processing unit 14 from the selected coefficient ROM and supplies to the class-classification adaptive processing unit 14.

To the class-classification adaptive processing unit 14, the taken image is supplied from the image sensor unit 11. The class-classification adaptive processing unit 14 classifies the supplied taken image to a specified class according to a characteristic thereof, and outputs a class-code as a result of classification to the coefficient ROM storage unit 13. Then, a prediction coefficient corresponding to the outputted class code is supplied from the coefficient ROM storage unit 13 to the class-classification adaptive processing unit 14.

The class-classification adaptive processing unit 14 calculates using the taken image supplied from the image sensor 11 and the prediction coefficient corresponding to the class classified according to the characteristic of the taken image, which is supplied from the coefficient ROM storage unit 13, thereby outputting a processed image in which noise removal processing is performed to the taken image.

FIG. 4 is a block diagram showing the detailed configuration example of the class-classification adaptive processing unit 14 of FIG. 3.

The class-classification adaptive processing unit 14 includes a class classification unit 21, a prediction tap extraction unit 22 and a prediction calculation unit 23. The class classification unit 21 further includes a class tap extraction unit 31 and a class code generating unit 32.

A taken image from the image sensor unit 11 (FIG. 3) is supplied to the prediction tap extraction unit 22 and the class tap extraction unit 31.

The class classification unit 21 sequentially focuses pixels included in the image to be processed, and classifies the focused pixel to any class of some classes of the taken image (performs class classification). Specifically, the class tap extraction unit 31 extracts some of pixels included in the taken image, which are used for class-classifying the focused pixel, as a class tap. Information of which pixel is the focused pixel in pixels included in the image to be processed is previously decided in the imaging apparatus 1.

The class code generating unit 32 performs class-classification based on pixels included in the class tap from the class tap extraction unit 31, and generates a class code corresponding to the class obtained by the classification to output it to the coefficient ROM storage unit 13 (FIG. 3).

As a method of performing class classification, for example, ADRC (Adaptive Dynamic Range Coding) can be applied.

In the method using ADRC, pixel values of pixels included in the class tap are ADRC-processed, and a class of the focused pixel is decided according to an ADRC code obtained by the processing.

In a K-bit ADRC method, for example, a maximum value MAX and a minimum value MIN of pixel values of pixels included in the class tap are detected, and DR=MAX−MIN is allowed to be a local dynamic range of a set, then, the pixel values included in the class tap are re-quantized to K-bit based on the dynamic range DR. That is, the minimum value MIN is subtracted from a pixel value of each pixel included in the class tap, and the subtracted value is divided (quantized) by $DR/2^k$. Then, a bit string in which K-bit pixel values of respective pixels included in the class tap obtained as described above are aligned in a prescribed order is outputted as an ADRC code. Therefore, for example, the class tap is ADRC processed by one bit, pixel values of respective pixels included in the class tap are divided by a mean value of the maximum value MAX and the minimum value MIN (cut off after the decimal point), accordingly, the pixel values of respective pixels are taken as 1-bit (digitalized). The bit string in which the pixel values of 1-bit are aligned in a prescribed order is outputted as the ADRC code. The class code generating unit 32, for example, generates (outputs) the ADRC code obtained by performing ADRC processing to the class tap as a class code.

In addition to the above method, the class code generating circuit 32 can also perform class-classification, for example, by regarding pixels included in the class tap as components of a vector and quantizing the vector.

The prediction tap extraction unit 22 extracts (pixel values of) pixels included in the taken image, which are used for predicting a pixel value of the focused pixel as a prediction tap.

Specifically, the prediction tap extraction unit 22 extracts plural pixels from the taken image as a prediction tap, which are located spatially near a pixel corresponding to the focused pixel of the taken image (for example, pixels of the taken image located spatially nearest from the focused pixel).

It is possible that the prediction tap and the class tap have the same tap structure or different tap structures.

To the prediction calculation unit 23, in addition to the prediction tap supplied from the prediction tap extraction unit 22, a prediction coefficient is supplied from the coefficient ROM storage unit 13 (FIG. 3) The prediction tap calculation unit 23 performs a prescribed prediction calculation for finding a prediction value of a true value of the focused pixel by using the prediction tap and the prediction coefficient. Accordingly, the prediction calculation unit 23 calculates (a prediction value of) the pixel value of the focused pixel, namely, pixel values of pixels included in the processed image to be outputted.

Figure 5A:
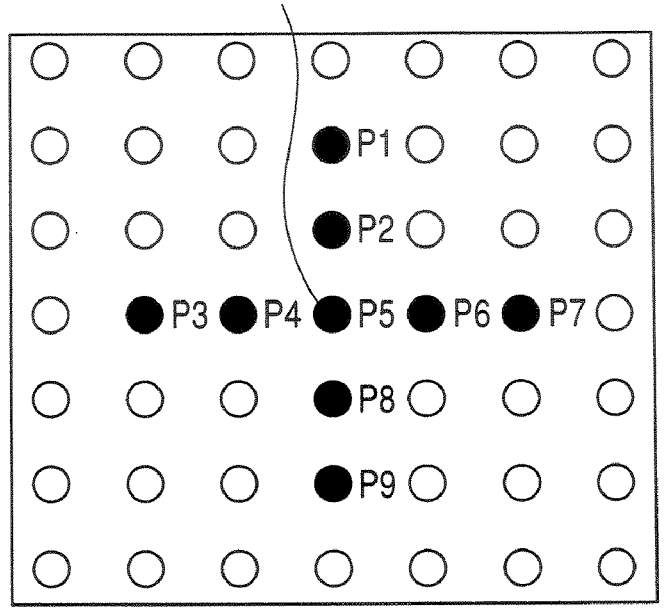
FIGS. 5A and 5B are views showing tap structure examples of a prediction tap and a class tap.
Figure 5B:
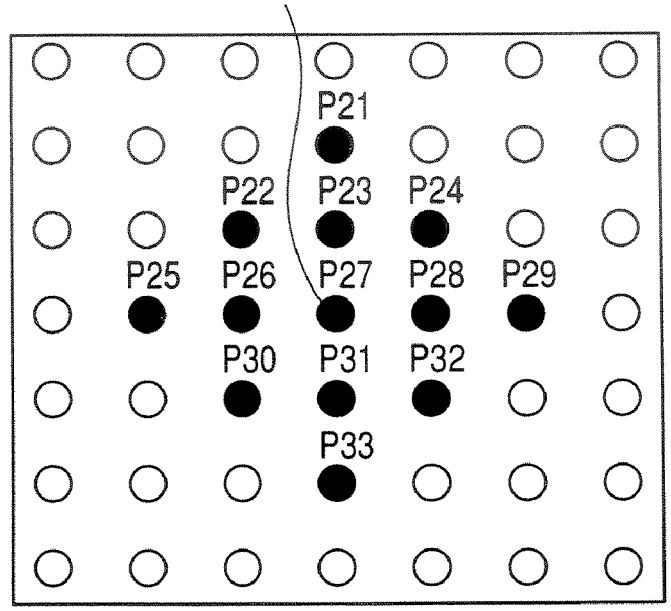

FIGS. 5A and 5B show examples of the tap structures of the prediction tap and the class tap. The tap structures of the prediction tap and the class tap can be structures other than structures shown in FIGS. 5A and 5B.

FIG. 5A shows an example of the tap structure of the class tap. In FIG. 5A, nine pixels compose the class tap. Specifically, in FIG. 5A, a pixel P5 corresponding to the focused pixel, respective two pixels adjacent to the pixel P5 in an upper direction, a lower direction, a left direction and a right direction, namely, P2, P1, P8, P9, P4, P3, P6 and P7 in the taken image outputted by the image sensor unit 11 compose a so-called cross-shaped class tap.

Figure 13:
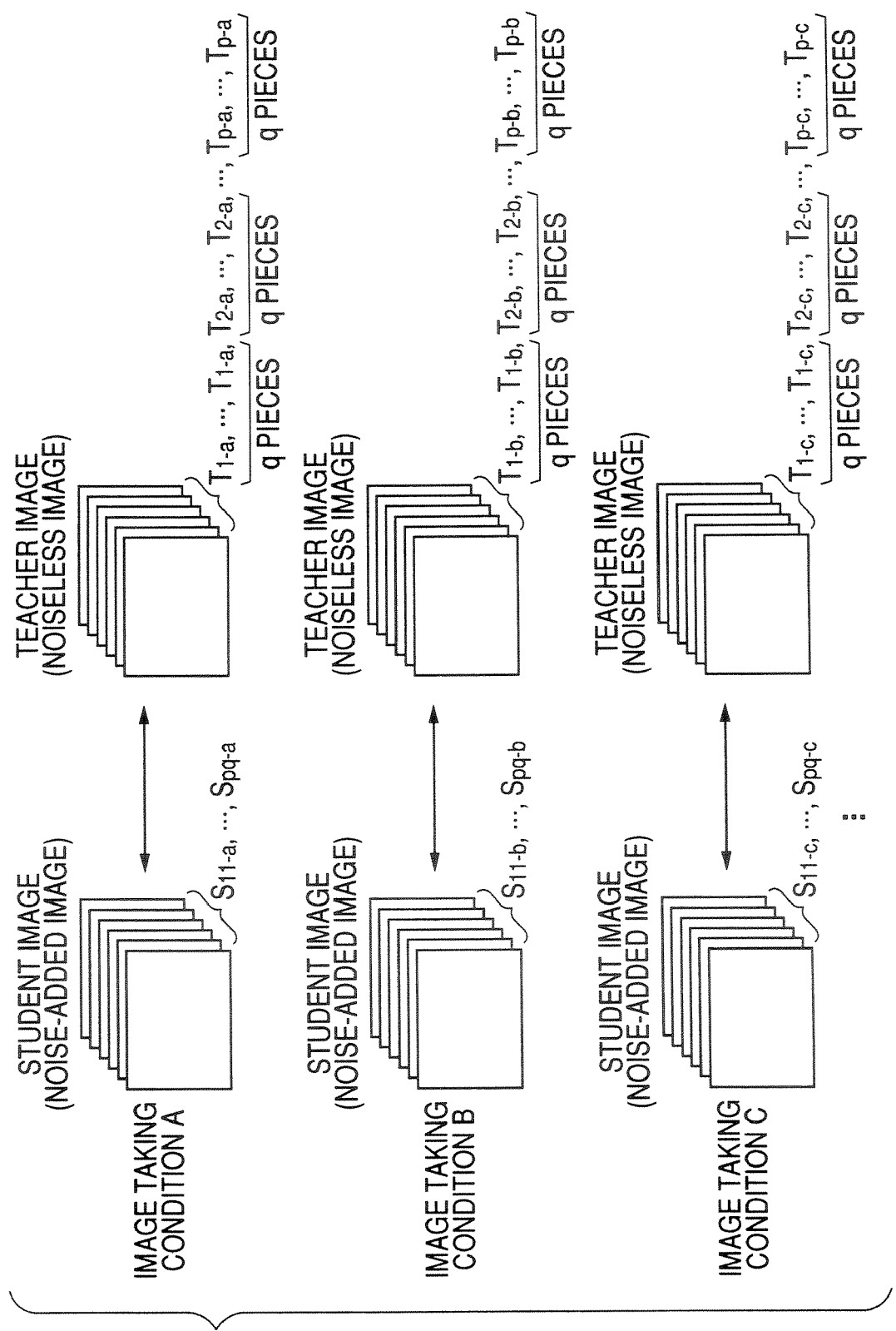
FIG. 13 is a view explaining generation of learning data.

FIG. 5B shows an example of the tap structure of the prediction tap. In FIG. 5B, 13 pieces of pixel compose the prediction tap. Specifically, in FIG. 5B, 5 pixels aligned in a longitudinal direction P21, P23, P27, P31, and P33 having the pixel P27 corresponding to the focused pixel in the center, respective 3 pixels P22, P26, P30 and P24, P28, P32 aligned in the longitudinal direction having a pixel P26 and a pixel P28 which are right-and-left adjacent to the pixel P27 corresponding to the focused pixel in the center, and pixels P25 and P29 distant in right and left directions by one pixel from the pixel P27 corresponding to the focused pixel in the taken image outputted from the image sensor 11 compose a so-called rhombic shaped prediction tap.

Next, the prediction calculation in the prediction calculation unit 23 in FIG. 4 and learning of the prediction coefficient used for the prediction calculation will be explained.

Now, as a prescribed prediction calculation in which the prediction tap is extracted from the taken image and a pixel value of a pixel (hereinafter, appropriately referred to as processed image pixel) included in the processed image from which noise is removed is calculated (predicted) by using the prediction tap and the prediction coefficient, for example, when a linear primary formula prediction calculation is applied, a pixel value "y" of the processed image pixel can be calculated by the following linear primary formula.

$$y = \sum_{n=1}^{N} w_n x_n \qquad (1)$$

In the formula (1), $x_n$ expresses a pixel value of an n-numbered pixel (hereinafter, appropriately referred to as a taken image pixel) included in the taken image, which is included in the prediction tap with respect to the processed image pixel "y", and $w_n$ expresses an n-numbered prediction coefficient which is multiplied by the n-numbered (the pixel value of) taken image pixel. In the formula (1), the prediction tap is composed of N-pieces of taken image pixels $x_1, x_2, \ldots, X_N$.

It is also possible to calculate the pixel value "y" of the processed image pixel not by the linear primary formula shown in the formula (1) but by a higher order formula of more than quadratic formula.

Now a true value of a pixel value of the processed image pixel of a k-numbered sample is expressed as $y_k$, and when a prediction value of the value $y_k$ obtained by the formula (1) is expressed as $y_k'$, a prediction error $e_k$ thereof is expressed as the following formula.

$$e_k = y_k - y_k' \qquad (2)$$

Since the prediction value $y_k'$ can be calculated by the formula (1), $y_k'$ of the formula (2) is replaced according to the formula (1), the following formula can be obtained.

$$e_k = y_k - \left( \sum_{n=1}^{N} w_n x_{n,k} \right) \qquad (3)$$

In the formula (3), $x_{n,k}$ expresses an n-numbered taken image pixel included in the prediction tap with respect to processed image pixel of the k-numbered sample.

A prediction coefficient $w_n$ which allows the prediction error $e_k$ of the formula (3) (or the formula (2)) to be "0 (zero)" is the optimum value for predicting the processed image pixel, however, it is generally difficult to calculate such prediction coefficients $w_n$ with respect to all processed image pixels.

Accordingly, as a regulation expressing that the prediction coefficient $w_n$ is the optimum value, for example, when a least-squares method is applied, the optimum prediction coefficient $w_n$ can be calculated by allowing the total sum "E" of square error expressed by the following formula to be minimum.

$$E = \sum_{k=1}^{K} e_k^2 \quad (4)$$

In the formula (4), K expresses the number of samples (the number of samples for learning) of sets of the processed image pixel $y_k$ and the taken image pixels $x_{1,k}, x_{2,K}, \ldots X_{N,K}$ included in the prediction tap with respect to the processed image pixel $y_k$.

The minimum value (smallest value) of the total sum "E" of the square error in the formula (4) is given by $w_n$ which allows a result of partially differentiating the total sum "E" of the square error by the prediction coefficient $w_n$ to be "0 (zero)".

$$\frac{\partial E}{\partial w_n} = e_1 \frac{\partial e_1}{\partial w_n} + e_2 \frac{\partial e_2}{\partial w_n} + \ldots + e_k \frac{\partial e_n}{\partial w_n} = 0 \quad (5)$$

$(n = 1, 2, \ldots, N)$

Then, when the above formula (3) is partially differentiated by the prediction coefficient $w_n$, the following formula can be obtained.

$$\frac{\partial e_k}{\partial w_1} = -x_{1,k}, \frac{\partial e_k}{\partial w_2} = -x_{2,k}, \ldots, \frac{\partial e_k}{\partial w_n} = -x_{N,k}, \quad (6)$$

$(k = 1, 2, \ldots, K)$

From the formula (5) and the formula (6), the following formula can be obtained.

$$\sum_{k=1}^{K} e_k x_{1,k} = 0, \sum_{k=1}^{K} e_k x_{2,k} = 0, \ldots \sum_{k=1}^{K} e_k x_{N,k} = 0 \quad (7)$$

By substituting the formula (3) into $e_k$ of the formula (7), the formula (7) can be expressed by a normal equation shown by a formula (8).

The normal equation of the formula (8) can be solved for the prediction coefficient $w_n$ by using, for example, the sweep out method (Gauss-Jordan elimination method) and the like.

By solving the normal equation of the formula (8) created at each class, the optimum prediction coefficient (in this case, the prediction coefficient allowing the total sum "E" of the square error to be minimum) $W_n$ can be calculated according to the class.

The noise removal processing of the imaging apparatus 1 for calculating processed image in which noise of the taken image is removed will be explained with reference to FIG. 6.

First, in step S1, the image sensor unit 11 takes an image of a subject and outputs the taken image obtained as the result thereof to the class-classification adaptive processing unit 14, and in step S2, outputs image taking condition information of the taken image to the coefficient ROM number calculation unit 12.

In step S3, the coefficient ROM number calculation unit 12 acquires unique information of the image sensor 11a supplied from the operation unit, the communication unit or the like.

In step S4, the class tap extraction unit 31 decides a predetermined pixel as a focused pixel in pixels included in the processed image to be calculated.

In step S5, the coefficient ROM number calculation unit 12 decides the optimum coefficient ROM for the focused pixel from among the coefficient ROMs 13-1 to 13-r stored in the coefficient ROM storage unit 13 based on the image taking condition information and the unique information, and outputs the coefficient ROM number specifying the coefficient ROM number to the coefficient ROM storage unit 13.

In step S6, the class tap extraction unit 31 extracts some pixels included in the taken image as a class tap, which are used for performing class-classification of the focused pixel.

In step S7, the class code generating unit 32 performs class-classification based on pixels included in the class tap from class tap extraction unit 31, and calculates a class code corresponding to the class obtained as the result of classification.

In step S8, the coefficient ROM storage unit 13 selects the coefficient ROM corresponding to the coefficient ROM number supplied from the coefficient ROM number calculation unit 12. Also in step S8, the coefficient ROM storage unit 13 acquires a prediction coefficient of the class indicated by the class code which is supplied from the class-classification adaptive processing unit 14 from the selected coefficient ROM to be outputted to the class-classification adaptive processing unit 14.

In step S9, the prediction tap extraction unit 22 extracts (pixel values of) pixels included in the taken image as a prediction tap, which are used for predicting a pixel value of the focused pixel.

$$\begin{bmatrix} \left(\sum_{k=1}^{K} x_{1,k} x_{1,k}\right) & \left(\sum_{k=1}^{K} x_{1,k} x_{2,k}\right) & \cdots & \left(\sum_{k=1}^{K} x_{1,k} x_{N,k}\right) \\ \left(\sum_{k=1}^{K} x_{2,k} x_{1,k}\right) & \left(\sum_{k=1}^{K} x_{2,k} x_{2,k}\right) & \cdots & \left(\sum_{k=1}^{K} x_{2,k} x_{N,k}\right) \\ \vdots & \vdots & \ddots & \vdots \\ \left(\sum_{k=1}^{K} x_{N,k} x_{1,k}\right) & \left(\sum_{k=1}^{K} x_{N,k} x_{2,k}\right) & \cdots & \left(\sum_{k=1}^{K} x_{N,k} x_{N,k}\right) \end{bmatrix} \begin{bmatrix} w_1 \\ w_2 \\ \vdots \\ w_N \end{bmatrix} = \begin{bmatrix} \left(\sum_{k=1}^{K} x_{1,k} y_k\right) \\ \left(\sum_{k=1}^{K} x_{2,k} y_k\right) \\ \vdots \\ \left(\sum_{k=1}^{K} x_{N,k} y_k\right) \end{bmatrix} \quad (8)$$

In step S10, the prediction calculation unit 23 performs calculation (prediction calculation) of the formula (1) by using the prediction tap supplied from the prediction tap extraction unit 22 and the prediction coefficient supplied from the coefficient ROM storage unit 13 to calculate the (pixel value of) focused pixel.

In step S11, the prediction calculation unit 23 judges whether all pixels of the processed image have been processed as the focused pixel, and when it is judged that all pixels in the processed image have not been processed as the focused pixel yet, the process returns to step S4. As a result, processing from step S4 to step S11 is performed with respect to processed image pixels which have not been processed as the focused pixel.

On the other hand, in step S11, when it is judged that all pixels of the processed image have been processed as the focused pixel, in step S12, the prediction calculation unit 23 outputs the processed image to end the process.

As described above, the processed image in which noise removal processing is performed with respect to the taken image from the image sensor unit 11 is calculated and outputted from the imaging apparatus 1. In the case that the imaging apparatus 1 takes moving images, the processing of FIG. 6 is repeated at each frame (field).

FIG. 7 shows a configuration example of learning apparatus in which learning of calculating a prediction coefficient $w_n$ of each class by creating and solving a normal equation of the formula (8).

A learning apparatus 51 of FIG. 7 includes a learning data generating unit 61, a learning pair database 62, a prediction tap extraction unit 631 a class tap extraction unit 64, a class code generating unit 65, a normal equation generating unit 66 and a prediction coefficient calculation unit 67.

The learning data generating unit 61 generates teacher images and student images as learning data used for learning of the prediction coefficient $w_n$ by variously changing the image taking condition, outputting them to the learning pair database 62.

To the learning pair database 62, many teacher images and student images generated at the learning data generating unit 61 in plural image taking conditions are supplied from the learning data generating unit 61. The learning pair database 62 allows a student image and a teacher image corresponding to the student image to be a pair (learning pair), with respect to respective many student images, and stores them by grouping them according to the image taking conditions. Then, the learning pair database 62 outputs student images as one of the learning pair in the predetermined image taking condition to the prediction tap extraction unit 63 and the class tap extraction unit 64, as well as outputs teacher images as the other of the learning pair to the normal equation generating unit 66.

The prediction tap extraction unit 63 sequentially focuses pixels included in the teacher image of the learning pair and extracts predetermined pixels in pixels of the student image of the learning pair with respect to the focused teacher pixel, thereby composing a prediction tap of the same tap structure as the one composed by the prediction tap extraction unit 22 of FIG. 4 to be supplied to the normal equation generating unit 66.

The class tap extraction 64 extracts predetermined pixels in pixels included in the student image with respect to the focused teacher pixel, thereby composing a class tap of the same tap structure as the one composed by the class tap extraction unit 31 in FIG. 4 to be supplied to the class code generating unit 65.

The class code generating unit 65 performs class-classification which is the same as the class code generating unit 32 in FIG. 4 based on the class tap outputted by the class tap extraction unit 64, and outputs a class code corresponding to the class obtained as the result of the classification to the normal equation generating unit 66.

The normal equation generating unit 66 reads out the focused teacher pixel fran the learning pair database 62 and performs summing of the focused teacher pixel and student image including the prediction tap composed with respect to the focused teacher pixel, which is supplied from the prediction tap extraction unit 63 according to the class code supplied from the class code generating unit 65.

Specifically, a teacher image $y_k$ stored in the learning pair database 62, a prediction $x_{n,k}$ outputted by the prediction tap extraction unit 63, and a class code outputted from the class code generating unit 65 are supplied to the normal equation generating unit 66.

Then, the normal equation generating unit 66 performs calculation corresponding to multiplication between the student images ($x_{n,k}$, $x_{n',k}$) and summation ($\Sigma$) in determinants of the left side of the formula (8) by using the prediction tap (student image) $x_{n,k}$ according to the class corresponding the class code supplied from the class code generating unit 65.

Furthermore, the normal equation generating unit 66 performs calculation corresponding to multiplication between the student images $x_{n,k}$ and the teacher image $y_k$ ($x_{n,k}y_k$) and summation ($\Sigma$) in vectors of the right side of the formula (8) by using the prediction tap (student image) $x_{n,k}$ also according to the class corresponding to the class code supplied from the class code generating unit 65.

Specifically, the normal equation generating unit 66 stores a component ($\Sigma x_{n,k}x_{n',k}$) of the determinants of the left side and a component ($\Sigma x_{n,k}y_k$) of the vector of the right side in the formula (8) calculated with respect to the teacher image which has been focused at the previous time in an internal memory (not shown), and performs summing (performs addition expressed by summation of the formula (8).) of a corresponding component $x_{n,k+1}x_{n',k+1}$ or $x_{n,k+1}y_{k+1}$, which is calculated by using the teacher image $y_{k+1}$ and the student image $x_{n,k+1}$ concerning the teacher image newly focused as a teacher pixel in the component ($\Sigma x_{n,k}x_{n',k}$) of the determinant or the component ($\Sigma x_{n,k}y_k$) of the vector.

Then, the normal equation generating unit 66 performs summing of the above, allowing all teacher data under a certain image taking condition which are stored in the learning pair database 62 to be the focused teacher pixel, thereby creating the normal equation shown in the formula (8) according to the class, then, the normal equation is supplied to the prediction coefficient calculation unit 67.

The prediction coefficient calculation unit 67 calculates and outputs the optimum prediction coefficient wn in a certain image taking condition according to the class by solving the normal equation concerning each class supplied from the normal equation generating unit 66 in a certain image taking condition.

Figure 8:
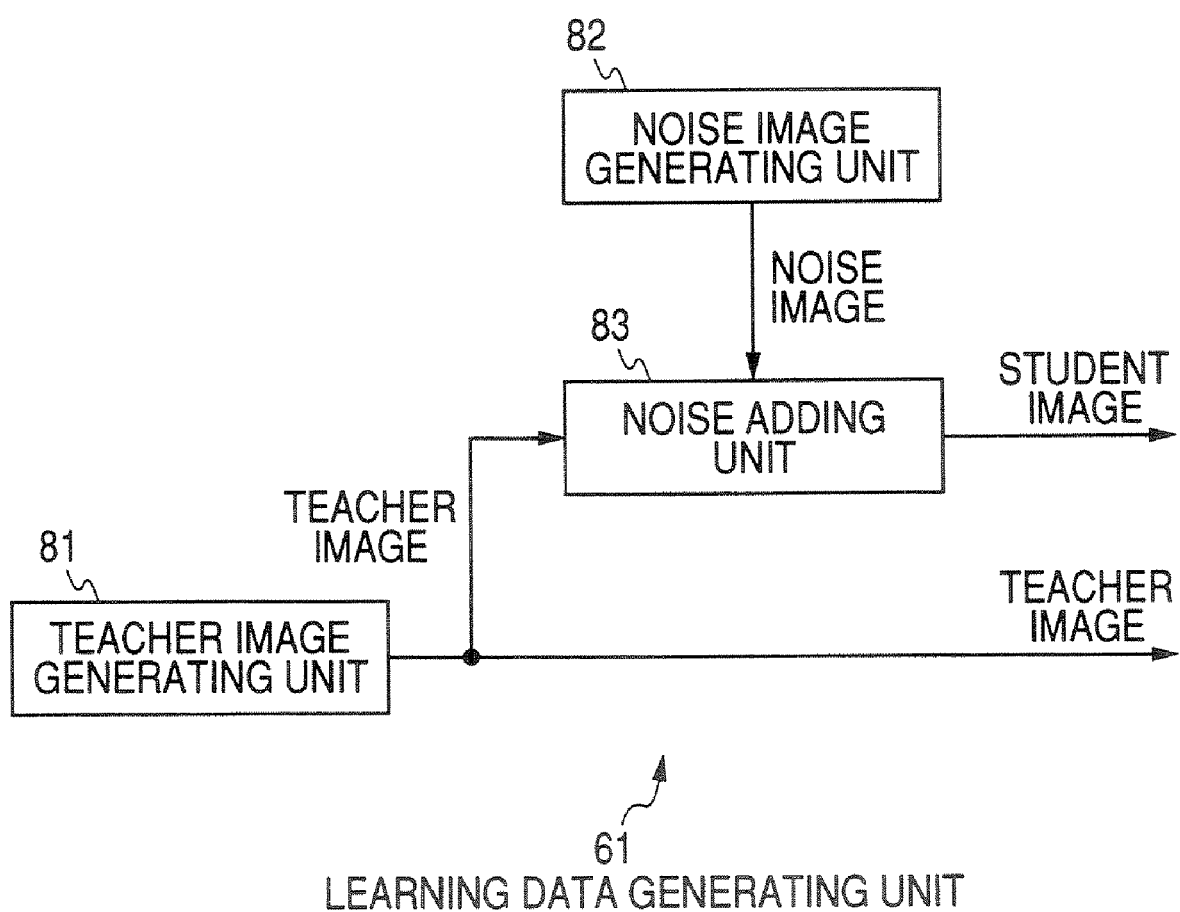
FIG. 8 is a block diagram showing the detailed configuration example of a learning data generating unit of FIG. 7.

FIG. 8 shows a block diagram showing the detailed configuration of the learning data generating unit 61 in FIG. 7.

The learning data generating unit 61 includes a teacher image generating unit 81, a noise image generating unit 82 and a noise adding unit 83.

The teacher image generating unit 81 generates teacher images to be teachers for learning. In the imaging apparatus 1 in FIG. 3, in order to remove noise of the taken images taken at the image sensor unit 11, it is necessary to generate teacher images by using an image sensor of a characteristic of high S/N ratio having lesser noise than the image sensor 11a used in the image sensor unit 11. Therefore, the teacher image generating unit 81 generates teacher images by using an image sensor which has a high aperture ratio and a high dynamic range for professional use, an image sensor in which one pixel has a large size, or a noise-reduced image sensor such as a cooled CCD sensor. It is also preferable that images artificially created by CG (Computer Graphics) and the like are used as teacher images. The teacher image generating unit 81 supplies the generated teacher images to the noise adding unit 83 and the learning pair database 62 (FIG. 7).

The noise image generating unit 82 generates images (noise images) including only noise (chiefly noise) by using an image sensor which is the same type number as the image sensor 11a used for the image sensor unit 11, and output them to the noise adding unit 83.

The noise adding unit 83 adds noise images acquired from the noise image generating unit 82 to teacher images supplied from the teacher image generating unit 81, and outputs images obtained as the result of the addition to the learning pair database 62 as student images. More specifically, the noise adding unit 83 generates student images by adding corresponding pixels between teacher images and noise images to be outputted to the learning pair database 62.

Figure 9:
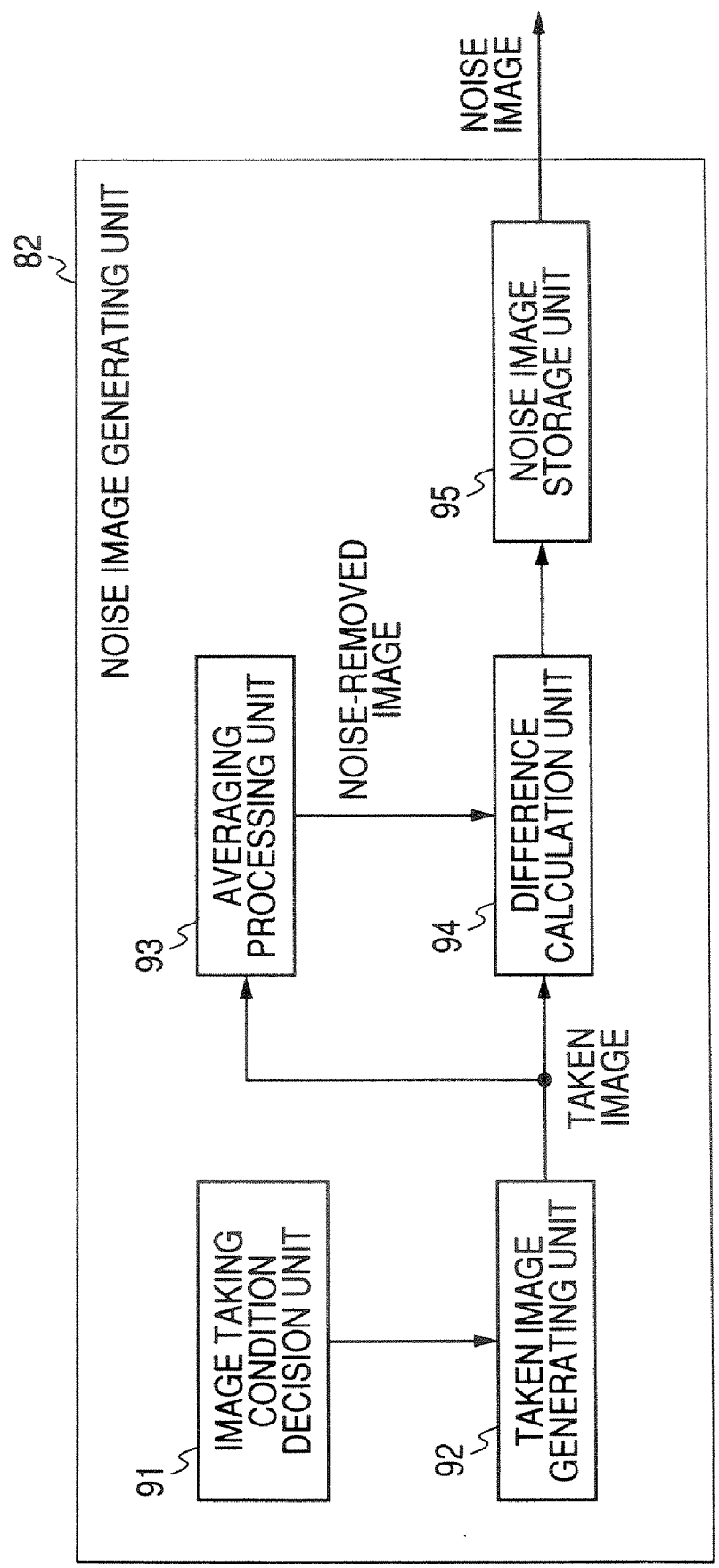
FIG. 9 is a block diagram showing the detailed configuration example of a noise image generating unit of FIG. 8.

FIG. 9 is a block diagram showing the detailed configuration example of the noise image generating unit 82 in FIG. 8.

The noise image generating unit 82 includes an image taking condition decision unit 91, a taken image generating unit 92, an averaging processing unit 93, a difference calculation unit 94 and a noise image storage unit 95.

The image taking condition decision unit 91 decides an image taking condition such as luminance or exposure time of a subject, and outputs image taking condition information indicating the decided image taking condition to the taken image generating unit 92.

The taken image generating unit 92 has an image sensor which is the same type number (same type) as the image sensor 11a, and takes an image of a subject by using the image sensor to generate a taken image. At this time, the taken image generating unit 92 takes images under the image taking condition according to the image taking condition information supplied from the image taking condition decision unit 91. The taken image generating unit 92 repeats the generation of the taken image prescribed times to output prescribed pieces of taken images to the averaging processing unit 93 and the difference calculation unit 94. It should be noted that the subject to be taken by the taken image generating unit 92 is an object such as whose surface is uniform or a completely stationary object, namely, an object in which a pixel value of each pixel included in the image is fixed (invariant) while taking certain pieces of images.

The averaging processing unit 93 calculates an average value of pixel values between corresponding pixels (pixels at the same position in taken images) with respect to plural taken images supplied from the taken image generating unit 92, thereby calculating a representative pixel value of each pixel. The image to which the averaging processing is performed is regarded as an image indicating only a subject component, in other words, an image from which a noise component included in each pixel is removed, and the averaging processing unit 93 supplies the noise-removed images in which pixel values of respective pixels are representative pixel values to the difference calculation unit 94. The representative pixel value of each pixel can be calculated by filter processing such as the median filter.

The difference calculation unit 94 calculates the difference of corresponding pixel values between the taken image supplied from taken image generating unit 92 and the noise removed image supplied from the averaging processing unit 93, thereby generating a noise image in which the noise component is extracted (an image chiefly composed of only the noise component). The difference calculating unit 94 performs the processing with respect to plural taken images supplied from the taken image generating unit 92, and outputs the plural noise images to the noise image storage unit 95.

The noise image storage unit 95 stores plural noise images supplied from the difference calculation unit 94. The noise images indicate noise unique to the image sensor which is the same number as the image sensor 11a under the image taking condition decided by the image taking condition decision unit 91. The noise image storage unit 95 supplied the stored noise images to the noise adding unit 83 in FIG. 8 when necessary.

Next, with reference to FIG. 10 to FIG. 13, generation of learning data will be explained.

Figure 10:
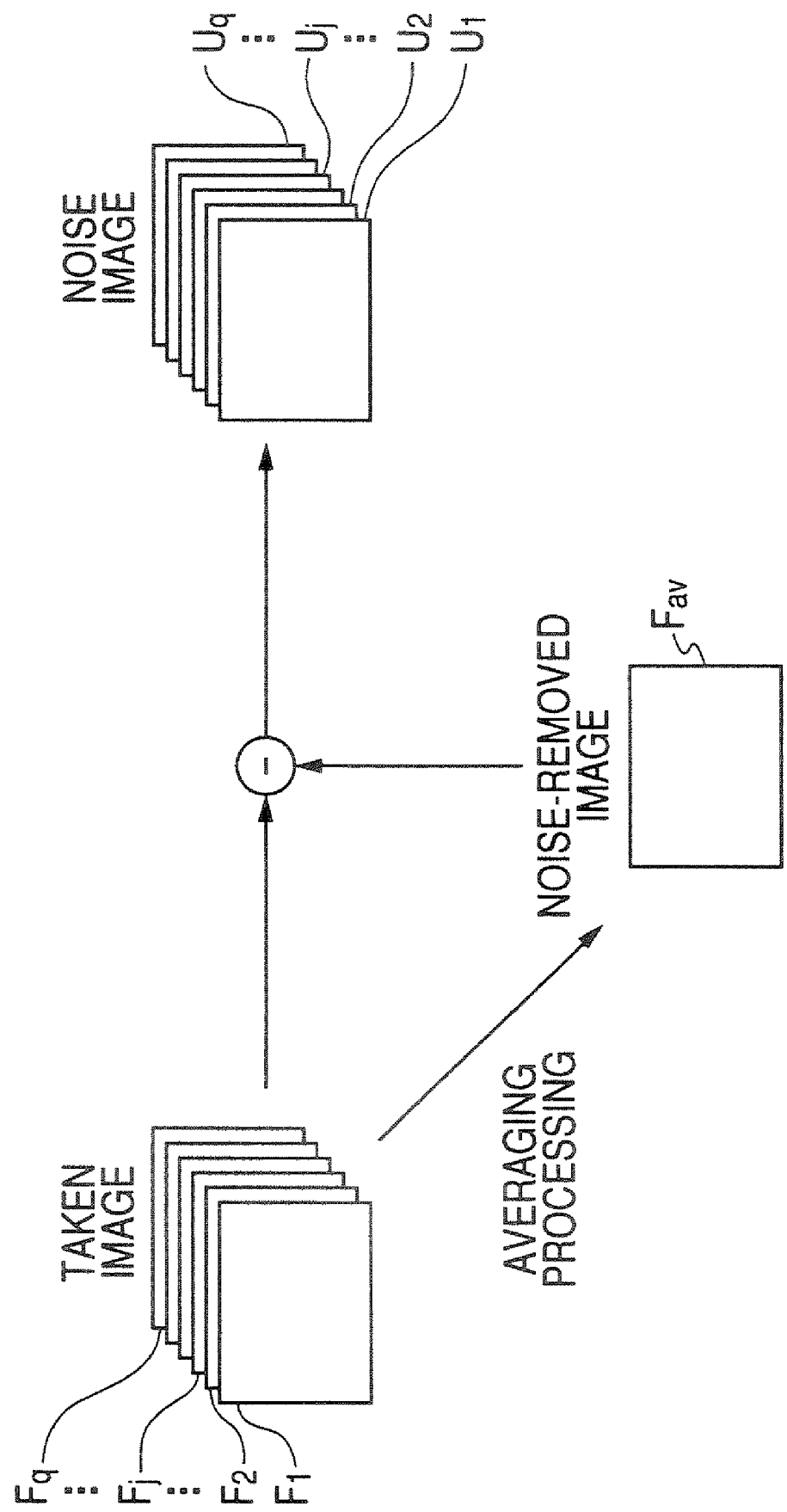
FIG. 10 is a view explaining generation of learning data.

FIG. 10 is a diagram schematically showing the generation of noise images by the noise image generating unit 82.

The taken image generating unit 92 takes an image of a subject using the image sensor which is the same type number as the image sensor 11a under the image taking condition decided by the image taking condition decision unit 91 to generate a taken image $F_j$ (j=1, ..., q).

The averaging processing unit 93 performs averaging processing of pixel values of corresponding pixels in plural pieces (q pieces) of taken images $F_j$ supplied from taken image generating unit 92 to generate a noise removed image $F_{av}$.

Figure 11A:
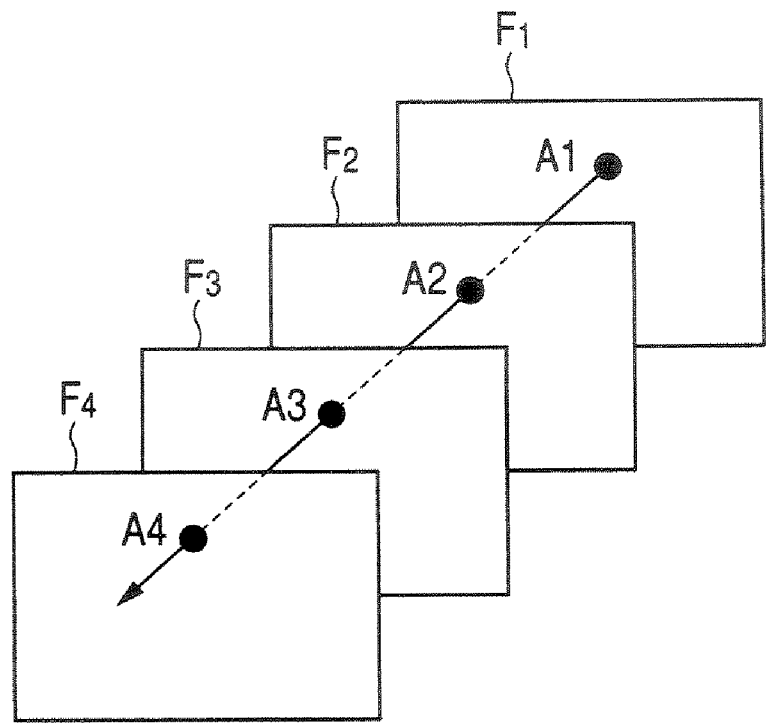
FIGS. 11A and 11B are views explaining generation of learning data.
Figure 11B:
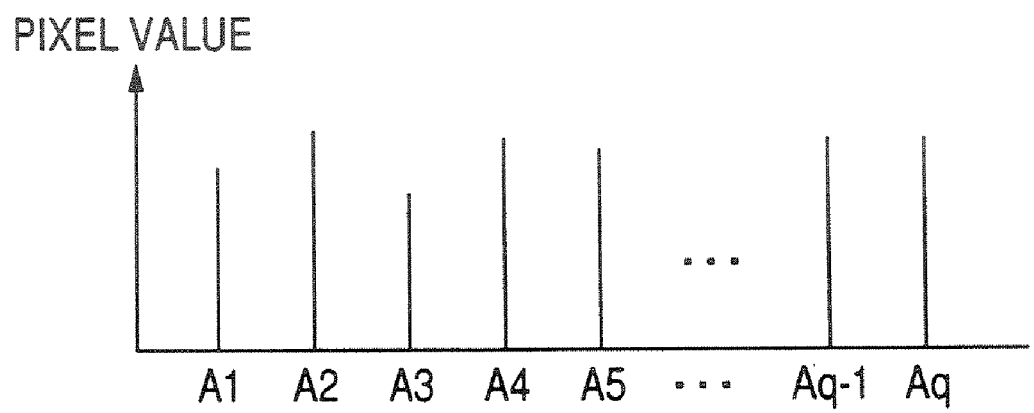

For example, as shown in FIG. 11A, pixels $A_1$ to $A_q$ (in FIG. 11A, only four taken images are shown) in a same position A of taken images $F_1$ to $F_q$ have different pixel values though the same subject is taken as shown in FIG. 11B.

The averaging processing unit 93 performs averaging processing with respect to all pixels in the noise removed image $F_{av}$, in which a pixel value $A_{av}$ of a pixel in the position A of the noise removed image $F_{av}$ is made to be the average value of pixel values of pixels $A_1$ to $A_q$.

Then, the difference calculation unit 94 generates a noise image $U_j$ by subtracting a pixel value of a corresponding pixel in the noise removed image $F_{av}$ supplied from the averaging processing unit 93 from each pixel of the taken image $F_j$ supplied from the taken image generating unit 92 as shown in FIG. 10.

FIG. 12 is a diagram schematically showing generation of student images by the learning data generation unit 61.

The teacher image generating unit 81 generates plural pieces of (p pieces) of teacher images $T_i$ (i=1, ..., p) by using the image sensor having a characteristic of higher S/N ratio than the image sensor 11a.

The noise adding unit 83 adds noise images U1 to Uq acquired from the noise image generating unit 82 to respective teacher images $T_1$ to $T_p$ supplied from the teacher image generating unit 81 to generate student images ($S_{11}$ to $S_{1q}$), ($S_{21}$ to $S_{2q}$), ..., ($S_{p1}$ to $S_{pq}$).

For example, the noise adding unit 83 generates student images $S_{11}$ to $S_{1q}$ by adding respective noise images $U_1$ to $U_q$ to the teacher images $T_1$. The noise adding unit 83 also generates student images $S_{21}$ to $S_{2q}$ by adding respective noise images $U_1$ to $U_q$ to the teacher image $T_2$.

After that, in the same way, the learning data generating unit 61 generates "q" pieces of student images $S_{i1}$ to $S_{iq}$ with respect to one teacher image $T_i$, and output them to learning pair database 62.

The learning pair database 62 assigns the teacher image $T_i$ to respective "q" pieces of student images $S_{i1}$ to $S_{iq}$ to generate pairs (learning pair) of "q" pairs of teacher images and student images. Accordingly, in the learning pair database 62, (p×q) pairs of teacher images and student images (learning pairs) are generated under a certain image taking condition.

The above generation (processing) of learning data is executed repeatedly by changing the image taking condition, as a result, pairs of teacher images and the student images (learning pairs) under various image taking conditions are stored in the learning pair database 62.

For example, as shown in FIG. 13, (p×q) pairs of learning pairs between student images $S_{11-a}$ to $S_{1q-a}$ and corresponding teacher images $T_{1-a'}, \ldots, T_{1-a}$ (q pieces of $T_{1-a}$), $T_{2-a'}, \ldots, T_{2-a}$ (q pieces of $T_{2-a}$), $T_{p-a'}, \ldots, T_{p-a}$ (q pieces of $T_{p-a}$) under an image taking condition A, (p×q) pairs of learning pairs between student images $S_{11-b}$ to $S_{1q-b}$ and corresponding teacher images $T_{1-b'}, \ldots, T_{1-b}$ (q pieces of $T_{1-b}$), $T_{2-b'}, \ldots, T_{2-b}$ (q pieces of $T_{2-b}$), $T_{p-b'}, \ldots, T_{p-b}$ (q pieces of $T_{p-b}$) under an image taking condition B, and (p×q) pairs of learning pairs between student images $S_{11-c}$ to $S_{1q-c}$ and corresponding teacher images $T_{1-c'}, \ldots, T_{1-c}$ (q pieces of $T_1$-c), $T_{2-c'}, \ldots, T_{2-c}$ (q pieces of $T_{2-c}$), $T_{p-c'}, \ldots, T_{p-c}$ (q pieces of $T_{p-c}$) under an image taking condition C are stored in the learning pair database 62.

Next, learning processing of the learning apparatus 51 under a certain condition will be explained with reference to a flowchart of FIG. 14.

First, in step S31, the learning data generating unit 61 performs learning data generating processing. The details of the processing will be described with reference to FIG. 15. The learning data generating unit 61 generates learning data and supplies it to the learning pair database 62 to be stored therein.

In step S32, the prediction tap extraction unit 63 decides a pixel which has not been focused as the teacher image pixel in a teacher image $T_i$ (i=any of 1, ..., p) stored in the learning pair database 62. In step S32, the prediction tap extraction unit 63 extracts a prediction tap with respect to the focused teacher pixel from student images $S_{ij}$ (J=any of 1, ..., q) to be supplied to the normal equation generating unit 66.

In step S33, the class tap extraction unit 64 extracts a class tap with respect to the focused teacher pixel from the student image $S_{ij}$ stored in the learning pair database 62 to be supplied to the class code generating unit 65.

In step S34, the class code generating unit 65 performs class-classification of the focused teacher pixel based on the class tap with respect to the focused teacher pixel, and outputs a class code corresponding to a class obtained by the classification to the normal equation generating unit 66.

In step S35, the normal equation generating unit 66 reads out the focused teacher pixel from the learning pair database 62 and performs summing of the formula (8) for the focus teacher pixel and the student image $S_{ij}$ composing the prediction tap formed with respect to the focused teacher pixel, which is supplied from the prediction tap extraction unit 63, according to the class code (class) supplied from the class code generating unit 65.

In step S36, the prediction tap extraction unit 63 judges whether any teacher image whose pixel has not been focused is stored in the learning pair database 62. In step S36, when it is judged that a teacher image whose pixel has not been focused is stored in the learning pair database 62, the process returns to step S32, and the prediction tap extraction unit 63 newly decides a pixel in the teacher image which has not been focused as a focused teacher pixel. After that, the same processing will be repeated.

On the other hand, in step S36, when it is judged that any teacher image whose pixel has not been focused in not stored in the learning pair database 62, in step S37, the normal equation generating unit 66 supplies determinants in the left side and vectors in the right side in the formula (8) according to the class obtained by the above processing to the prediction coefficient calculation unit 67.

In step S37, the prediction coefficient calculation unit 67 solves normal equations according to the class created by determinants in the left side and vectors in the right side in the formula (8) according to the class supplied from the normal equation generating unit 66, thereby calculating a prediction coefficient $w_n$ according to class to be outputted, and the process ends.

Because of insufficient numbers of learning data and the like, there can be a class in which it is difficult to obtain the number of normal equations necessary for calculating the prediction coefficient. In such class, the prediction coefficient calculation unit 67 outputs, for example, a default prediction coefficient.

Next, the details of the learning data generating processing executed at the step S31 of FIG. 14 will be explained with reference to a flowchart of FIG. 15.

First, in step S51, the image taking condition decision unit 91 decides the image taking condition, and outputs image taking condition information indicating the decided image taking condition to the taken image generating unit 92.

In step S52, the taken image generating unit 92 takes an image of a subject by using an image sensor which is the same type number as the image sensor 11a to generate a taken image. In step S52, the processing is repeated prescribed times, and plural taken images $F_1$ to $F_q$ taken with respect to the same subject are supplied from the taken image generating unit 92 to the averaging processing unit 93 and the difference calculation unit 94.

In the step S53, the averaging processing unit 93 calculates an average value of pixel values between corresponding pixels (pixels at the same position in the taken images) with respect to plural taken images $F_1$ to $F_q$ supplied from the taken image generating unit 92, thereby calculating a representative pixel value of each pixel. The averaging processing unit 93 also generates a noise removed image $F_{av}$ in step S53, in which a pixel value of each pixel is a representative pixel value to be supplied to the difference calculation unit 94.

In step S54, the difference calculation unit 94 generates plural noise images $U_1$ to $U_q$ by subtracting the noise removed image $F_{av}$ from plural taken images $F_1$ to $F_q$ supplied from the taken image generating unit 92, outputting them to the noise image storage unit 95.

In step S55, the noise image storage unit 95 stores plural noise images $U_1$ to $U_q$ supplied from the difference calculation unit 94.

In step S56, the teacher image generating unit 81 generates teacher images $T_1$ to $T_p$ by using an image sensor having a characteristic of higher S/N ratio than the image sensor 11a.

In step S57, the noise adding unit 83 adds noise images $U_1$ to $U_q$ acquired from the noise image generating unit 82 to the teacher image $T_i$ (i=1, ..., p) supplied from the teacher image generating unit 81 to generate student images $S_{i1}$ to $S_{iq}$, outputting them to the learning pair database 62.

In step S58, the learning pair database 62 generates and stores "q" pairs of teacher images and student images (learning pair) by assigning the teacher image $T_i$ to respective "q" pieces of student image $S_{i1}$ to $S_{iq}$.

The learning processing of FIG. 14 is repeated by setting different image taking conditions, thereby calculating prediction coefficients according to the class in plural image taking conditions. Then, the calculated prediction coefficients according to the class are stored in the respective coefficient ROMs 13-1 to 13-r of the coefficient ROM storage unit 13 according to the image taking conditions.

As described above, in the learning processing, the image taking condition is decided, taken images using the image sensor having the same type number as the image sensor 11a are generated, and noise images are further generated from the taken images. Then, many pairs of teacher images and student images (learning pairs) are generated by using the generated noise images, and a prediction coefficient $w_n$ is calculated by using them. Therefore, the prediction coefficient $w_n$ which is optimum for the noise characteristic of the image sensor 11a used for the image sensor unit 11 can be calculated under a certain image taking condition.

In the manufacture of a semiconductor device (image sensor), it is difficult to manufacture plural semiconductor devices so that they have completely the same characteristic (photoelectric conversion efficiency, wiring capacity, noise resistance, the amount of leakage current and the like), therefore, there occur certain degree of individual differences in the semiconductor devices. In the noise removal processing using the class-classification adaptive processing in the related arts, it is difficult to say that noise is sufficiently removed in consideration of the difference of noise characteristics in the image sensors caused by the individual differences of semiconductor devices, however, in the imaging apparatus of FIG. 3, the class-classification adaptive processing is performed by using the prediction coefficient $w_n$ which is optimum for the noise characteristic of the image sensor 11a by the learning apparatus 51 as described above, therefore, noise removal processing in consideration of the noise characteristics of the image sensor 11a can be performed to taken images outputted from the image sensor unit 11. That is to say, noise of taken images can be removed more positively depending on the noise characteristics of the image sensor 11a.

There is a case in which trouble occurs in the manufacturing processes of the semiconductor devices and the image sensor (pixel) becomes a defect (defective pixel). Consequently, an embodiment (second embodiment) of an imaging apparatus in which not only the noise removal processing but also correction processing of the defective pixel is performed will be explained.

First, the concept of a detection method of detecting a defective pixel will be explained with reference to FIGS. 16A and 16B and FIGS. 17A and 17B.

Figure 16A:
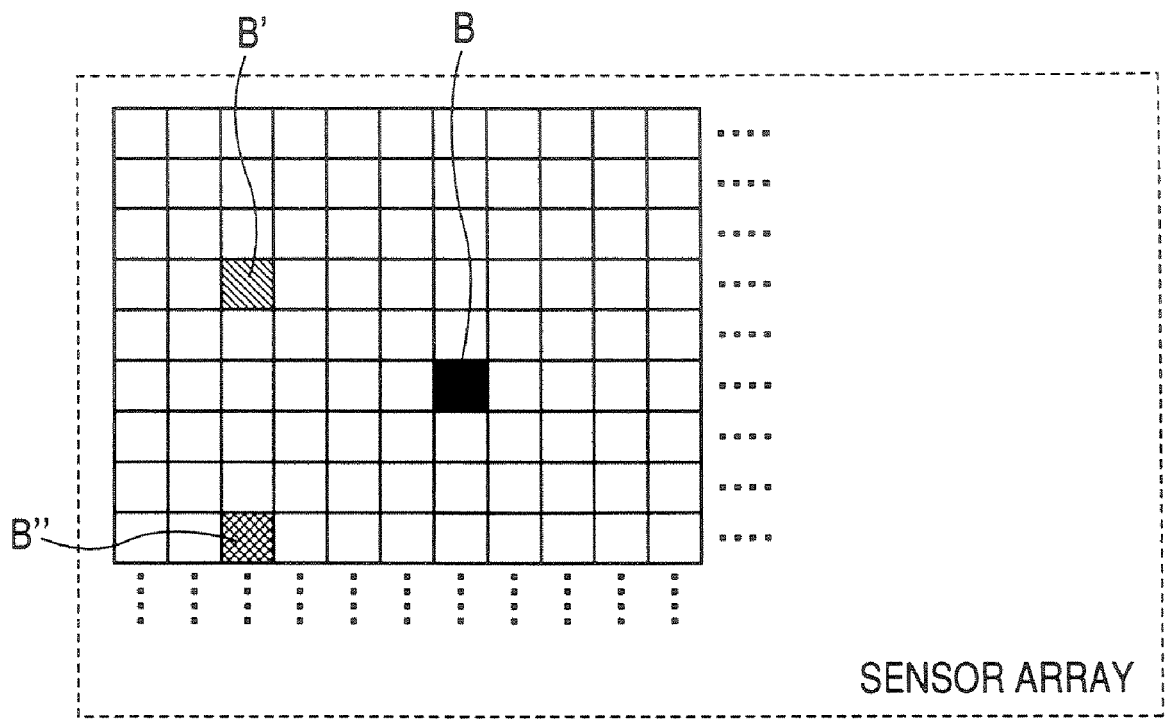
FIGS. 16A and 16B are views explaining the concept of a detection method detecting a defective pixel.

FIG. 16A shows an example in which three pixels B, B' and B" are defective pixels in a sensor array is shown.

Figure 16B:
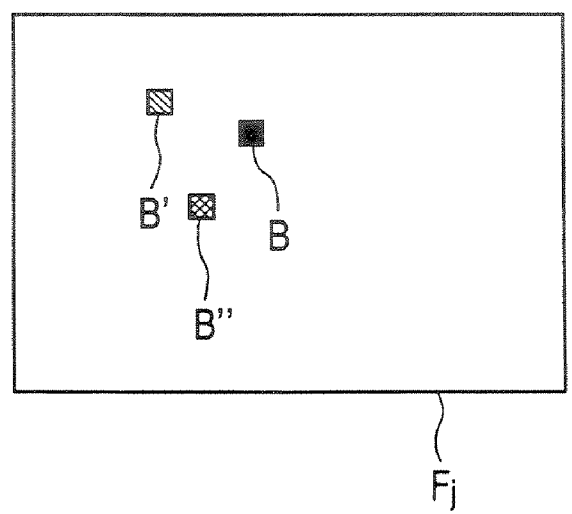

Assuming that the pixel (image sensor) outputs a pixel value of 8-bit (0 to 255), when the pixel is a defective pixel, the pixel value of the defective pixel will be, for example, a constant value. That is, as shown in FIG. 16B, in the taken image $F_j$, the defective pixel continues to output a pixel value of regularly "0 (zero)" as the pixel B, continues to output a constant pixel value of any of 1 to 254 as the pixel B', or continue to output a pixel value of regularly 255 as the pixel B".

Figure 17A:
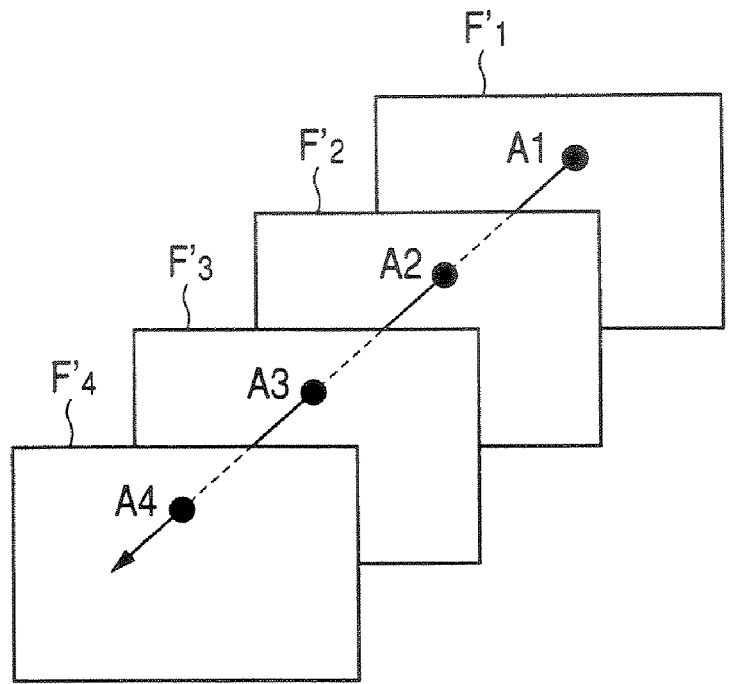
FIGS. 17A and 17B are views explaining the concept of a detection method detecting a defective pixel.
Figure 17B:
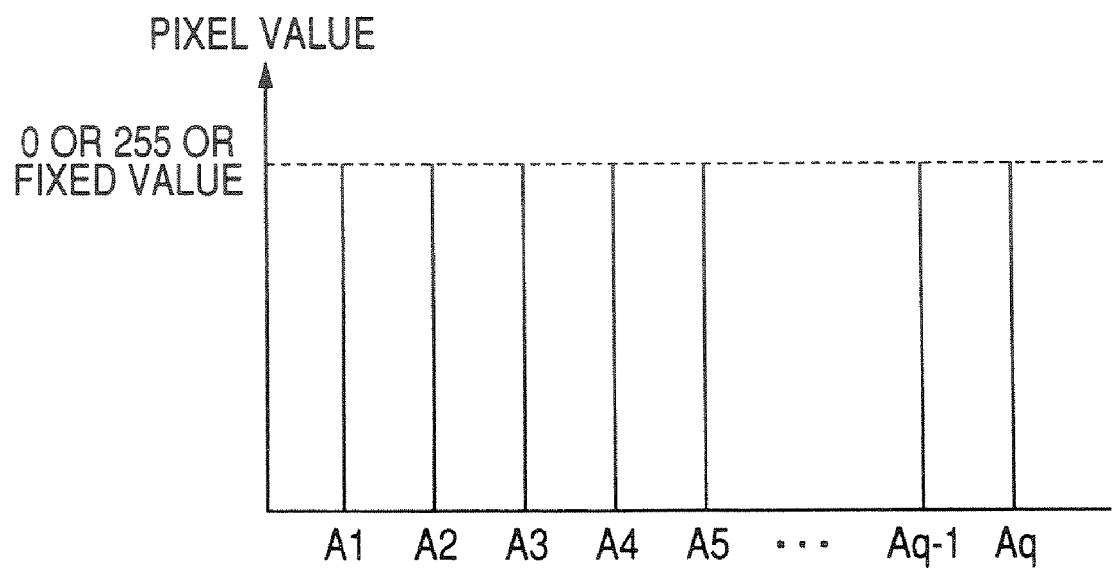

The image sensor unit 11 takes images of plural test charts which are made so that pixel values at the same position will not be the same value, thereby generating plural pieces of taken images $F'_1$ to $F'_q$ (FIG. 17A). When pixels $A_1$ to $A_q$ at the same position A in the taken images $F'_1$ to $F'_q$ are regularly at a constant pixel value of any of 0 to 255, as shown in FIG. 17B, it is possible to detect that the pixel at the position A in the taken images $F'_1$ to $F'_q$ is a defective pixel.

Even when the pixel is the defective pixel, a case can be considered, in which pixel values will not be the same value by effect of noise generated through transmission lines and the like, therefore it is preferable to judge the pixel as defective in the case that an absolute value of the difference of pixel values between predetermined pixels in the taken images $F'_1$ to $F'_q$ (the difference between the maximum value and the minimum value of pixel value) is less than a prescribed value (for example, 5 or less).

Figure 18:
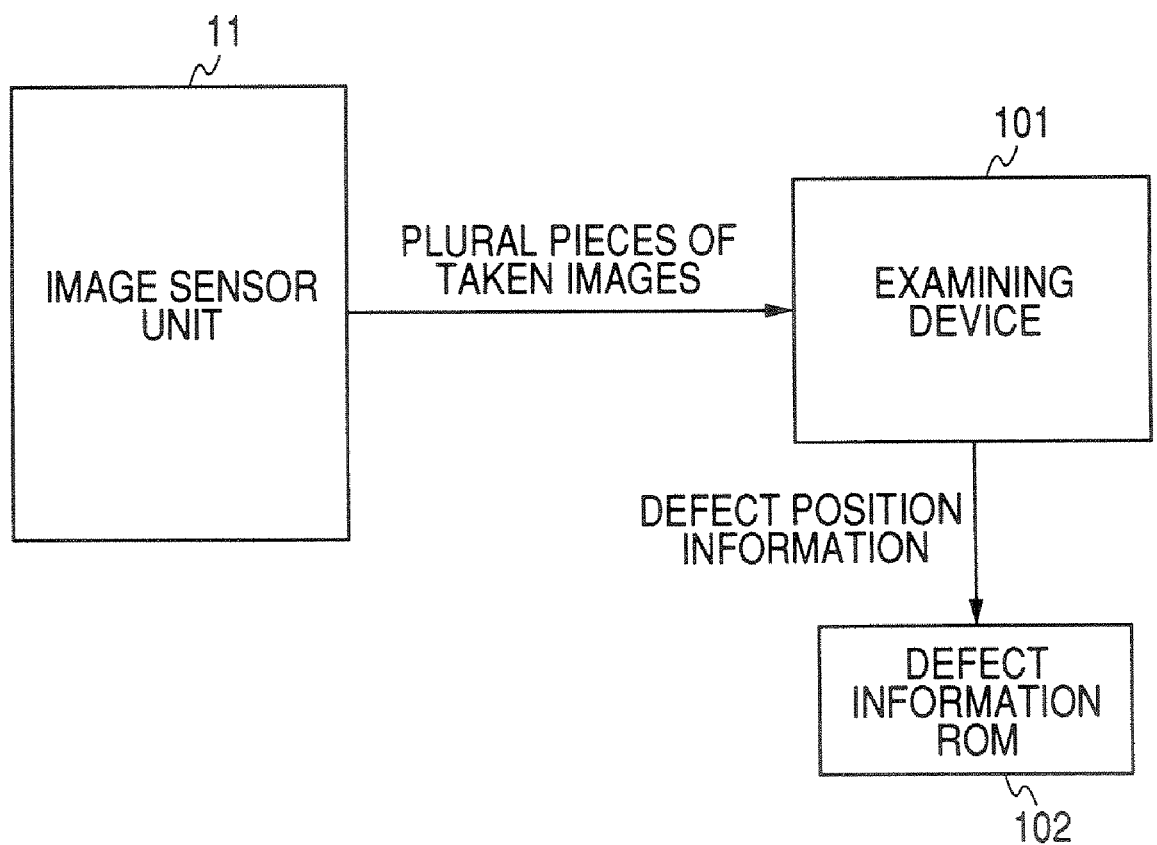
FIG. 18 is a block diagram showing a configuration example of a defective pixel detection system.

FIG. 18 shows a configuration example of a defective pixel detection system detecting a defective pixel in the image sensor unit 11 mounted on the imaging apparatus 1 of FIG. 3.

In the defective pixel detection system of FIG. 18, plural pieces of taken images $F'_1$ to $F'_q$ generated by taking images of plural test charts which were made so that pixel values at the same position in the taken image would not be the same value are outputted from the image sensor unit 11 to an examining device 101.

The examining device 101 examines whether each pixel included in the taken images $F'_1$ to $F'_q$ is a defective pixel by the above detection method (detects the defective pixel). Then, the examining device 101 supplies information indicating a position of the defective pixel to the detect information ROM 102 as defect position information when there is a defective pixel.

Figure 19:
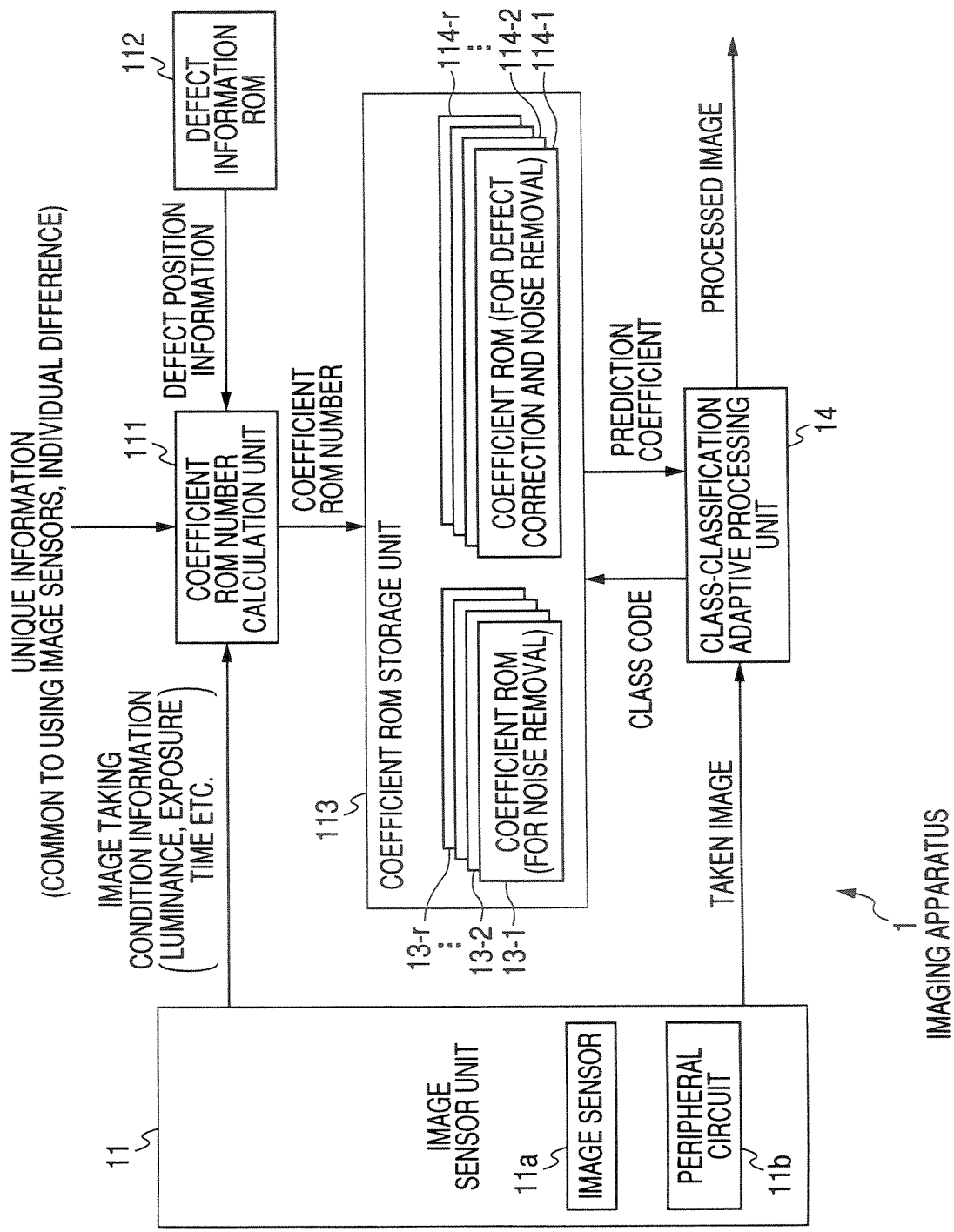
FIG. 19 is a block diagram showing a configuration example of a second embodiment of an imaging apparatus.

FIG. 19 shows a configuration example of a second embodiment of an imaging apparatus. In FIG. 19, components corresponding to ones in FIG. 3, the same signs are put, and explanations thereof are appropriately omitted.

The imaging apparatus 1 in FIG. 19 is common to the imaging apparatus 1 of FIG. 3 in a point that it has the image sensor unit 11 and the class-classification adaptive processing unit 14. In FIG. 19, a coefficient ROM number calculation unit 111 and a coefficient ROM storage unit 113 are provided instead of the coefficient ROM number calculation unit 12 and the coefficient ROM storage unit 13, and further, a defect information ROM 112 is provided anew.

To the coefficient ROM number calculation unit 111, image taking condition information and unique information are supplied in the same way as the coefficient ROM number calculation unit 12 of FIG. 3, and detect position information is supplied from the defect information ROM 112.

The coefficient ROM number calculation unit 111 designates the optimum coefficient ROM in the coefficient ROM storage unit 113 from among coefficient ROMs 13-1 to 13-$r$ and coefficient ROMs 114-1 to 114-$r$ stored in the coefficient ROM storage unit 113 based on the image taking condition information, the unique information and the defect position information.

Specifically, when the detect position information from the detect information ROM 112 indicates that there is not a defective pixel in the image sensor unit 11, the coefficient ROM number calculation unit 111 designates the optimum coefficient ROM in the coefficient ROM storage unit 113 from among the coefficient ROMs 13-1 to 13-$r$ based on image taking conformation and unique information.

On the other hand, when the detect position information from the detect information ROM 112 indicates that there is a defective pixel in the image sensor unit 11, the coefficient ROM number calculation unit 111 designates the optimum coefficient ROM in the coefficient ROM storage unit 113 from among the coefficient ROMs 114-1 to 114-$r$ based on image taking conformation and unique information. In the coefficient ROMs 114-1 to 114-$r$, prediction coefficients in which coefficients of the focused pixels as defective pixels are "0 (zero)" are stored.

The defect information ROM 112 stores defect position information of the image sensor unit 11, and outputs it to the coefficient ROM number calculation unit 111 when necessary. It is noted that the defect information Rom 112 can acquire defect position information of the image sensor unit 11 by copying detect position information stored in the defect information ROM 102 of FIG. 18, and can also acquire defect position information of the image sensor unit 11 by mounting the defect information ROM 102 on the imaging apparatus 1 as the defect information ROM 112.

The coefficient ROM storage unit 113 includes coefficient ROMs 13-1 to 13-r which are the same as the coefficient ROM storage unit 13 of FIG. 3. The coefficient ROMs 13-1 to 13-r stores prediction coefficients for removing noise when there is not a defective pixel in the image sensor unit 11 according to the class.

The coefficient ROM storage unit 113 also includes coefficient ROMs 114-1 to 114-r. The coefficient ROMs 114-1 to 114-r store prediction coefficients for correcting the defective pixel when there is a defective pixel in the image sensor unit 11 and further removing noise according to class.

The prediction coefficients stored in the coefficient ROMs 114-1 to 114-r are generated by using the learning apparatus 51 of FIG. 7 in a manner as follows.

First, before the taken image generating unit 92 of FIG. 9 generates taken images, whether there is a defective pixel in the image sensor which takes images (image sensor which has the same type number as the image sensor 11a) is examined by using the defective pixel detection system of FIG. 18. Now, when a defective pixel is detected at a pixel position PX in the image sensor of the taken image generating unit 92, a prediction coefficient obtained by learning using taken images which were taken by the image sensor will be a prediction coefficient for correcting the defective pixel as well as for removing noise when there is a defective pixel at the pixel position PX of the image sensor 11a.

An image sensor having a defective pixel at a pixel position PY which is different from the pixel position PX (image sensor having the same type number as the image sensor 11a) is applied for the taken image generating unit 92, a prediction coefficient obtained by learning using taken images taken by the image sensor will be a prediction coefficient for correcting the defective pixel when there is a defective pixel at the pixel position PY of the image sensor 11a as well as for removing noise.

Similarly, by applying image sensors having defects in various pixel positions are applied for the taken image generating unit 92, prediction coefficients for correcting defective pixels of various pixel positions as well as for removing noise can be obtained. In the case that there are two or more defective pixels in one image sensor, prediction coefficients for correcting the defective pixels as well as for removing noise can be obtained.

The coefficient ROM storage unit 113 selects either the coefficient ROMs 13-1 to 13-r or the coefficient ROMs 114-1 to 114-r, depending on the coefficient ROM number supplied from the coefficient ROM number calculation unit 111. The coefficient ROM storage unit 113 also acquires a prediction coefficient of a class indicated by a class code supplied by the class-classification adaptive processing unit 14 from the selected coefficient ROM to be outputted to the class-classification adaptive processing unit 14.

With reference to a flowchart of FIG. 20, noise removal processing by the imaging apparatus 1 of FIG. 19 will be explained.

First, in step S71, the image sensor unit 11 takes images of a subject and outputs taken images obtained accordingly to the class-classification adaptive processing unit 14, and in step S72, outputs image taking information indicating an image taking condition of the taken images to the coefficient ROM number calculating unit 111.

In step S73, the coefficient ROM number calculation unit 111 acquires unique information supplied from the operation unit or the communication unit.

In step S74, the coefficient ROM number calculation unit 111 acquires defect position information of the image sensor unit 11 from the defect information ROM 112.

In step S75, the class tap extraction unit 31 of the class-classification adaptive processing unit 14 decides a certain pixel in pixels composing the processed image to be calculated as a focused pixel.

In step S76, the coefficient ROM number calculation unit ill judges whether the focused pixel is a defective pixel based on the defect position information from the defect information ROM 112.

In step S76, when it is judged that the focused pixel is not a defective pixel, the coefficient ROM number calculation unit 111 decides the optimal coefficient ROM from among the coefficient ROMs 13-1 to 13-r for removing noise based on the image taking condition information and unique information and outputs the coefficient ROM number specifying the coefficient ROM to the coefficient ROM storage unit 113 in step S77.

On the other hand, when it is judged that the focused pixel is the defective pixel in step S76, in step S78, the coefficient ROM number calculation unit 111 decides the optimum coefficient ROM from among the coefficient ROMs 114-1 top 114-r for correcting the defect and removing noise based on the image taking condition information and the unique information and outputs the coefficient ROM number specifying the coefficient ROM to the coefficient ROM storage unit 113.

Processing of step S79 to step S85 executed after the processing of step S77 or step S78 is the same as processing of step S6 to step S12 in FIG. 6, therefore, the detailed explanation thereof will be omitted. In the processing of step S79 to step S85, a prediction coefficient corresponding to a class code calculated from the extracted class tap is supplied from the coefficient ROM storage unit 113 to the class-classification adaptive processing unit 14, and the class-classification adaptive processing unit 14 calculates a processed image from the prediction coefficient and the taken image, which is outputted.

Figure 20:
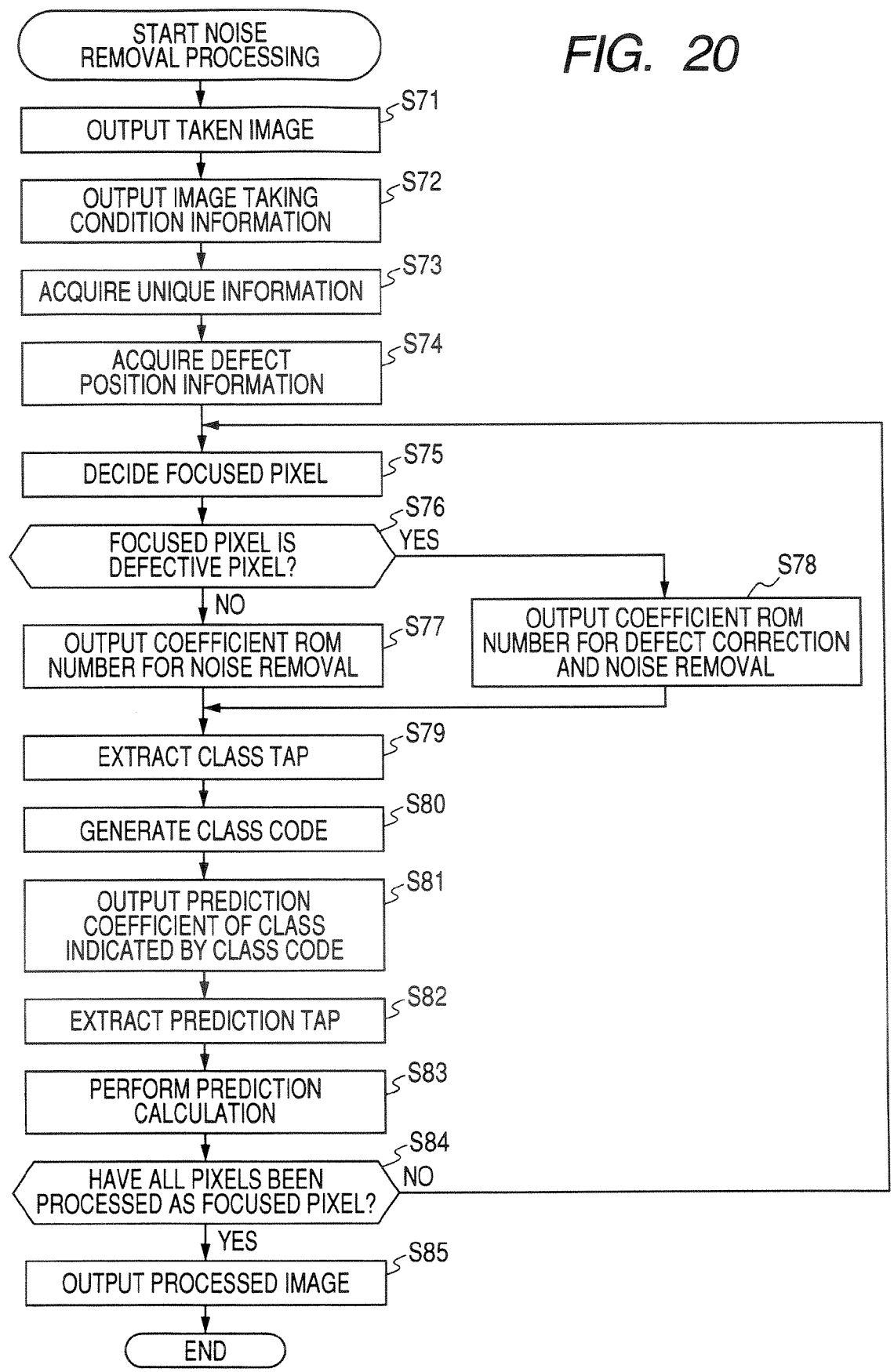
FIG. 20 is a flowchart explaining noise removal processing of the imaging apparatus of FIG. 19.

Therefore, in the noise removal processing of FIG. 20, noise of the taken image can be removed more positively depending on noise characteristics of the image sensor 11a in the same manner as the noise removal processing of FIG. 6, in addition, when there is a defect at the time of manufacturing in a pixel of the image sensor 11a, the defective pixel can be corrected. Since the defective pixel at the time of manufacturing can be corrected, the apparent yield of the image sensor can be improved.

Figure 21:
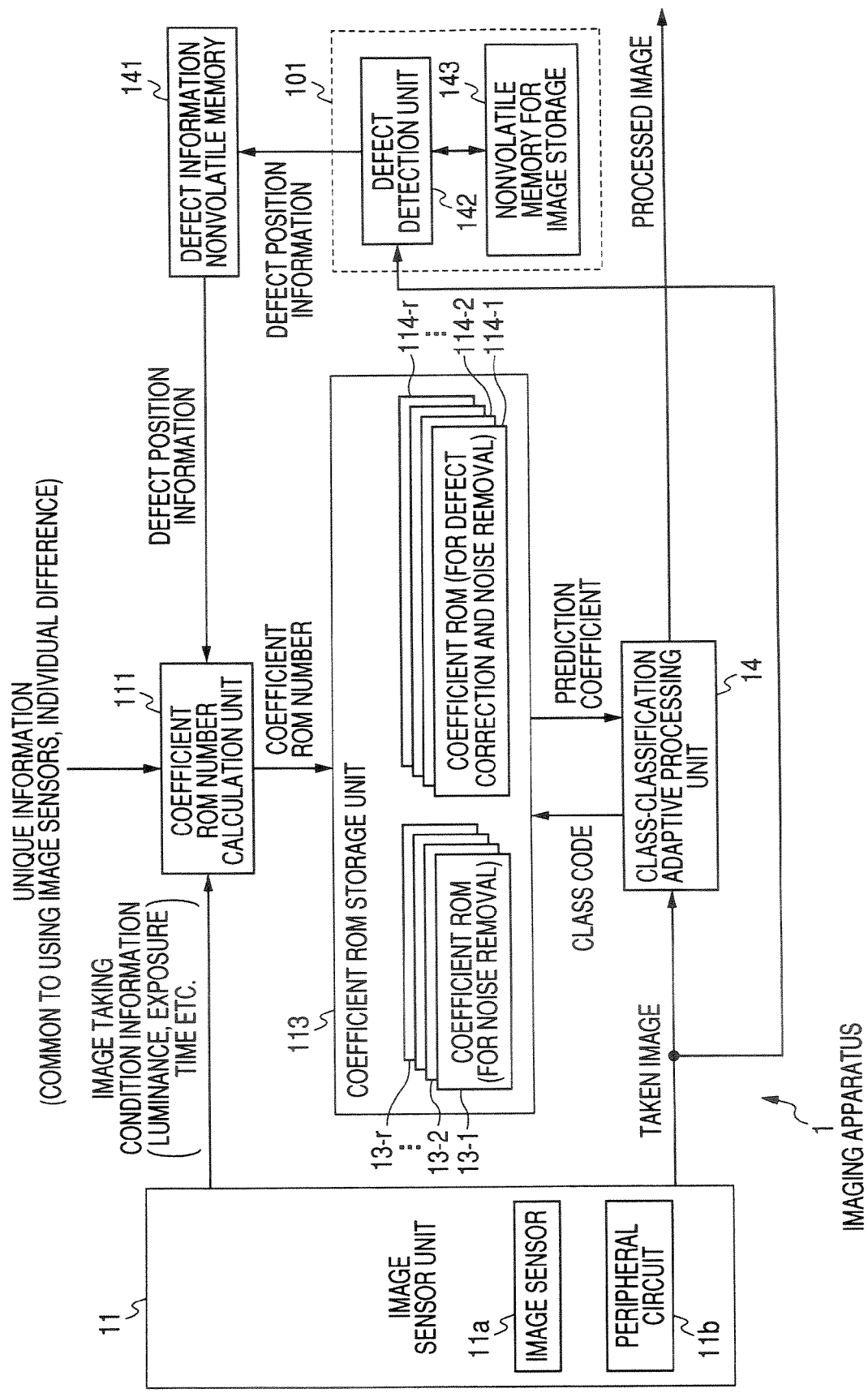
FIG. 21 is a block diagram showing a configuration example of a third embodiment of an imaging apparatus.

FIG. 21 shows a configuration example of a third embodiment of an imaging apparatus. In FIG. 21, concerning components corresponding to ones in FIG. 19, the same signs are put, and the explanations thereof will be appropriately omitted.

In the second embodiment, the defect position information indicating positions of defective pixels of the image sensor unit 11 calculated by the defective pixel detection system in FIG. 18 is stored in the defect information ROM 112 of the imaging apparatus 1 of FIG. 19. In the imaging apparatus 1 in FIG. 21, the imaging apparatus 1 itself detects a defective pixel and stores defect position information.

The imaging apparatus 1 in FIG. 21 is common to the imaging apparatus 1 in FIG. 19 in a point that it includes the image sensor unit 11, the coefficient ROM number calculation 111, the coefficient ROM storage unit 113, and the class-classification adaptive processing unit 14, and different from the imaging apparatus 1 in FIG. 19 in a point that it includes a defect information nonvolatile memory 141, a defect detection unit 142, and a nonvolatile memory for image storage 143 instead of the defect information ROM 112.

The defect information nonvolatile memory 141 stores (overwrites) defect position information of the image sensor unit 11 supplied from the defect detection unit 142, and supplies it to the coefficient ROM number calculation unit 111 when necessary.

The defect detection unit 142 detects a defective pixel of the image sensor unit 11 by comparing a taken image supplied from the image sensor unit 11 with a stored image supplied from the nonvolatile memory for image storage 143, and supplies defect position information indicating a position of the detected pixel to the defect information nonvolatile memory 141.

Specifically, the defect detection unit 142 judges whether pixel values of the focused pixel between corresponding pixels of the taken image and stored image are the same value. When it is judged that the pixel values of the focused pixel are the same value, the defect detection unit 142 increases a count number (CNT) of the pixel as the focused pixel by 1, which indicates the number of times when the pixel values becomes same. The defect detection unit 142 decides the pixel whose count number CNT reaches the predetermined number of times $CNT_{TH}$ as the defective pixel.

The stored images stored in the nonvolatile memory for image storage 143 are taken by the image sensor unit 11 and stored through the defect detection unit 142 long time ago to a degree that possibility in which pixel values of the same position becomes the same value is considered to be zero, for example, several days ago, several weeks ago or a time ago when images of several hundred pieces were taken. Since image taking time interval (sampling interval) between the taken image and the stored image is sufficiently long so that pixel values at the same position will not to be the same value as described above, the predetermined number of times $CNT_{TH}$ can be, for example, 2 to 4 times.

The defect detection unit 142 detects a defective pixel every time a taken image is supplied from the image sensor unit 11 and supplies defect position information as the result of detection to the defect information nonvolatile memory 141. The defect detection unit 142 supplies the taken image supplied from the image sensor unit 11 to the nonvolatile memory for image storage 143 as the stored data to be stored (overwritten) therein.

The nonvolatile memory for image storage 143 stores the taken image supplied from the defect detection unit 142 as the stored image. The nonvolatile memory for image storage 143 also stores a pixel position and the count number CNT of the pixel at which pixel values become the same.

The defect detection unit 142 and the nonvolatile memory for image storage 143 correspond to the examining device 101 in FIG. 18. However, in the examining device 101 in FIG. 18, pixel values of each pixel are compared by storing "q" pieces of taken images $F'_1$ to $F'_q$, whereas in the defect detection unit 142, the taken image and the storage image are simply compared, and it is unlikely that many defect images occur, therefore, the nonvolatile memory for image storage 143 only have to have storage capacity for storing a piece of taken image, pixel positions of several pixels and the count number CNT.

In the imaging apparatus 1 shown in FIG. 19, whether there is a defective pixel is judged by the examining device 101 of FIG. 18 before incorporating the image sensor unit 11 into the imaging apparatus 1, and defect position information as the judged result is stored in the defect information ROM 112, therefore, it is difficult to detect defective pixels of the image sensor unit 11 caused by aging or long time use, however, in the imaging apparatus 1 in FIG. 21, since the imaging apparatus 1 itself detects the defective pixel of the image sensor unit 11 and stores defect position information, a defective pixel occurring while the image sensor unit is used can be also detected. When the defective pixel is a focused pixel, the coefficient ROM number calculating unit 111 designates the coefficient ROMs 114-1 to 114-r for correcting the defective pixel as well as for removing noise, therefore, noise of the taken image can be removed more positively depending on noise characteristics of the image sensor 11a, in addition, in the case that there is a defective pixel in the image sensor unit 11 when it was manufactured or while it is used, the defective pixel can be corrected. Accordingly, the taken image is corrected so as to be the same as a case in which there is no defective pixel of the image sensor 11a, therefore, apparent reliability of the image sensor 11a will be improved.

In the imaging apparatus 1 of FIG. 3, FIG. 19 and FIG. 21, all or a part thereof including at least the image sensor unit 11 can be constructed as one chip. In this case, the difference between the chip can be small and the stable imaging apparatus 1 can be provided. Various configuration examples of the chip in the imaging apparatus 1 of FIG. 3 will be explained.

Figure 22:
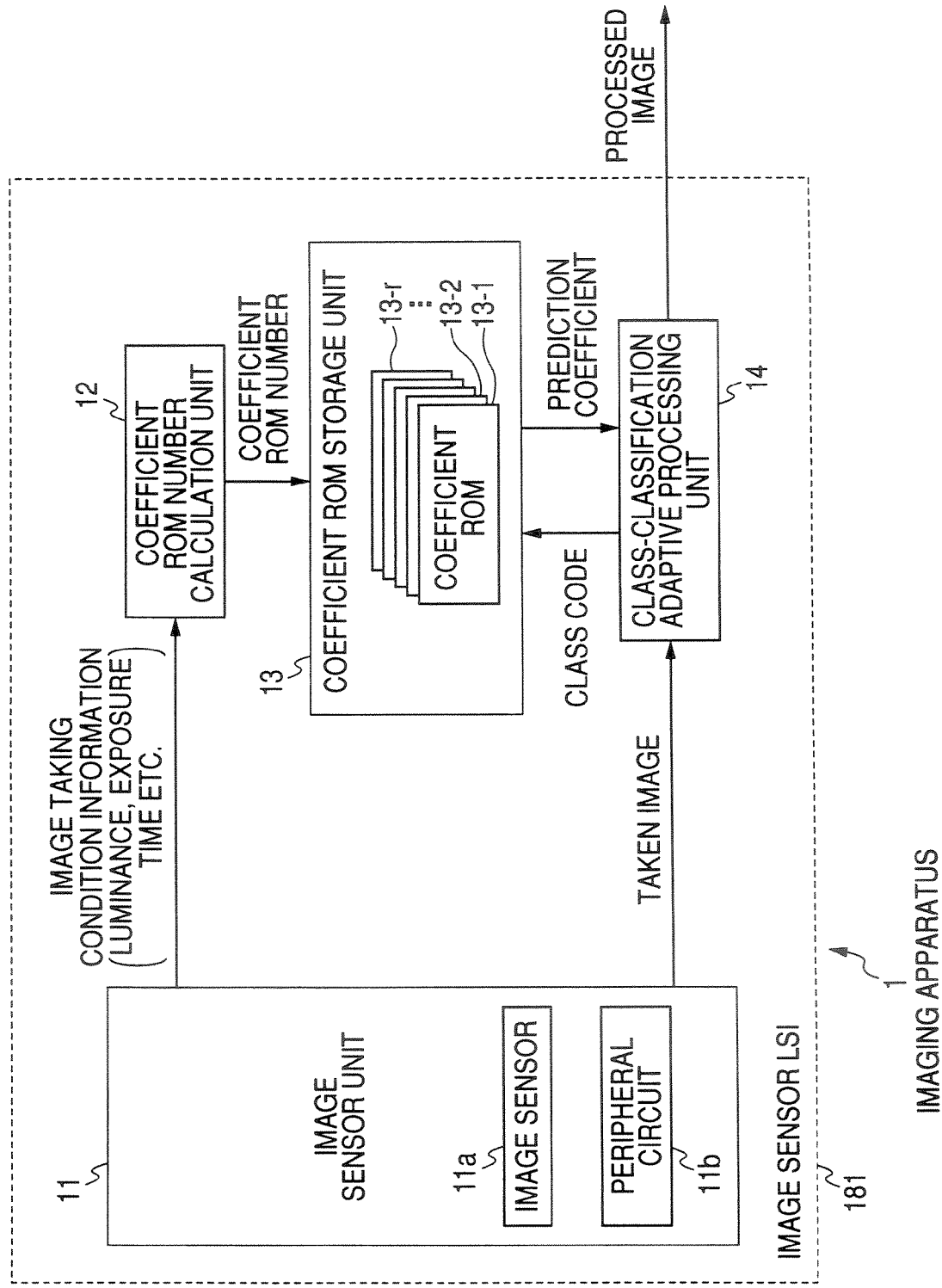
FIG. 22 is a block diagram explaining a configuration example of a chip in the imaging apparatus of FIG. 3.

In FIG. 22, the whole blocks of the imaging apparatus of FIG. 3, that is, the imaging sensor unit 11, the coefficient ROM number calculation unit 12, the coefficient ROM storage unit 13 and the class-classification adaptive processing unit 14 are realized as an image sensor LSI (Large Scale Integration) 181 by one chip.

Accordingly, when the whole blocks are incorporated in the image sensor LSI 181, it is not necessary that the coefficient ROMs 13-1 to 13-r correspond to various (various type number of) image sensors 11a, therefore, prediction coefficients corresponding to various image taking information and unique information can be stored. Or, when prediction coefficients are allowed to correspond to the same image taking condition information and the unique information, a small number of coefficient ROMs have to be installed.

Additionally, the image sensor to which the coefficient ROMs 13-1 to 13-r of the coefficient ROM storage unit 13 correspond is limited to the image sensor which is the same type number of image sensor 11a used for the image sensor unit 11, therefore, the coefficient ROM number calculation unit 12 does not have to acquire unique information.

When unique information includes information indicating characteristics (individual difference) of the image sensor 11a itself used for the image sensor unit 11, it is necessary that the coefficient ROMs 13-1 to 13-r includes writing device such as a fuse which has a circuit for writing and capable of being written only once, or nonvolatile memory and it is necessary to write information indicating individual difference after completion of the LSI.

Figure 23:
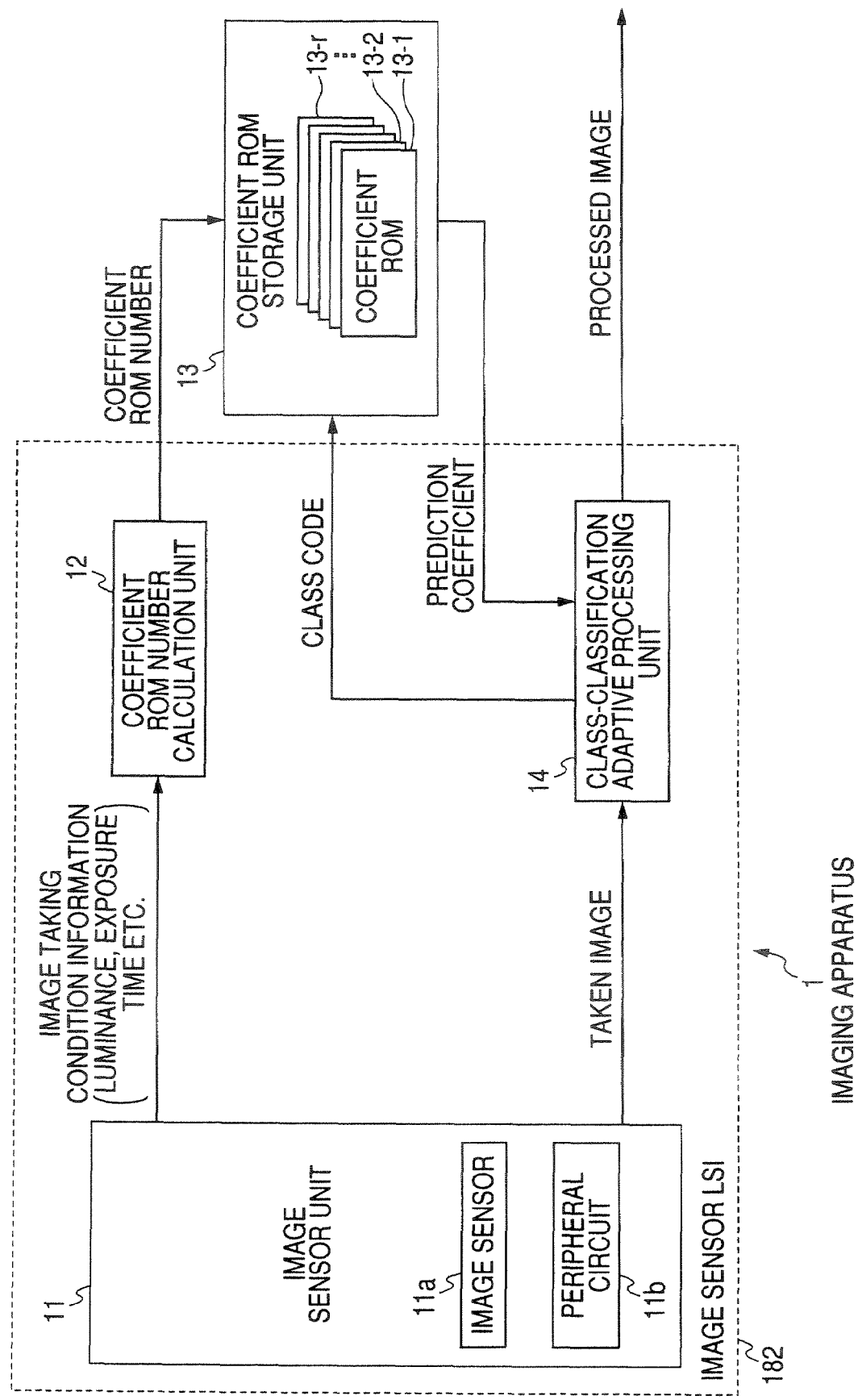
FIG. 23 is a block diagram explaining a configuration example of a chip in the imaging apparatus of FIG. 3.

As shown in FIG. 23, the image sensor unit 11, the coefficient ROM number calculation unit 12 and the class-classification adaptive processing unit 14 are realized excluding the coefficient ROM storage unit 13 as an image sensor LSI (Large Scale Integration) 182 by one chip.

In this case, it is not necessary that the coefficient ROMs 13-1 to 13-r have a circuit for writing, therefore, the coefficient ROM can be small in size. Further, the image sensor LSI 182 can be small in size because it is not necessary to provide with the coefficient ROM storage unit 13, and further, since the image sensor LSI 182 can be manufactured in a common structure, the cost of the LSI (chip) can be also reduced.

In FIG. 24, as it is obvious when compared with FIG. 23, the class-classification adaptive processing unit 14 is arranged outside of the chip in addition to the coefficient ROM storage unit 13, and the image sensor unit 11 and the coefficient ROM number calculation unit 12 are realized by one chip as an image sensor LSI (Large Scale Integration) 183.

In this case, the image taking condition information is processed in the image sensor LSI 183. Then, only the coefficient ROM numbers on which the image taking condition information is reflected are supplied from the image sensor LSI 183 to the coefficient ROM storage unit 13. In other words, it is possible to reduce the information amount by processing image taking condition information in the image sensor LSI 183.

In FIG. 25, only the image sensor unit 11 is realized by one chip as an image sensor LSI 184.

In this case, the coefficient ROM number calculation unit 12 and the class-classification adaptive processing unit 14 can be also configured as separate LSIs (chips), versatility of respective chips can be increased. That is, with respect to respective image sensor LSIs of different kinds of the image sensor 11a such as a CCD sensor or a CMOS sensor, or the image sensor 11a of different kinds of type number, the chip of the coefficient ROM number calculation unit 12 or the chip of the class-classification adaptive processing unit 14 can be used. The prediction coefficient stored in the coefficient ROM of the coefficient ROM storage unit 13 can be easily changed, and it is possible to respond to the difference of noise characteristics.

As described above, in the learning apparatus 51, noise images are generated by using the image sensor which has the same type number as the image sensor 11a, thereby calculating the optimum (specialized) prediction coefficient.

In the imaging apparatus 1, the optimum coefficient learned at the learning apparatus 51 is selected based on the image taking condition information from the image sensor unit 11, noise of the taken image can be removed more positively, depending on noise characteristics of the image sensor 11a used in the image sensor unit 11.

A series of processing performed by the above imaging apparatus 1 or the learning apparatus 51 can be performed by hardware as well as by software. When a series of processing is performed by software, a program including the software is installed in a general-purpose computer and the like.

FIG. 26 shows a configuration example according to an embodiment of a computer to which the program executing the above series of processing is installed.

The program can be previously stored in a hard disk 205 or a ROM 203 as a recording medium included in the computer.

In addition, the program can be recorded temporarily or permanently in removable recording media 211 such as a flexible disc, a CD-ROM (Compact Disc Read Only Memory), a MO (Magneto Optical) disc, a DVD (Digital Versatile disc), a magnetic disc, or a semiconductor memory. Such removable recording media 211 can be provided as so-called packaged software.

In addition to installation of the program in the computer from the above removable recording media 211, the program can be transferred from a download site in the computer by wireless through a satellite for digital satellite broadcasting, or transferred from a download site in the computer by wire through networks such as LAN (Local Area Network), or Internet. In the computer, the program transferred as the above is received at the communication unit 208 and installed in the hard disk 205 included therein.

The computer has a CPU (Central Processing Unit) 202 therein. An input and output interface 210 is connected to the CPU 202 through a bus 201, and the CPU 202 executes programs stored in a ROM (Read Only Memory) 203 according to a command which is inputted by an input unit 207 including a keyboard, a mouse, a microphone and the like operated by a user through the input and output interface. The CPU 202 also executes the program stored in the hard disk 205, the program transferred from the satellite or a network, received in a communication unit 208 and installed in the hard disk 205, or the program read out from the removable recording media 211 mounded on a drive 209 and installed in the hard disk 205, which are loaded into a RAM (Random Access Memory) 204. The imaging unit 212 takes images of a subject, and supplies the images obtained accordingly to the CPU 202 or the hard disk 205. Accordingly, the CPU 202 performs the processing according to the above flow charts, or processing performed by configurations of the above block diagrams. Then, the CPU 202 outputs the processed results from, for example, an output unit 206 including a LCD (Liquid Crystal Display), a speaker and the like or transmits the results from the communication unit 208 through the input and output interface 210, and further stores them in the hard disk 205.

It is not always necessary that the processing steps describing the program allowing the computer to execute various processing are processed along the order written as the flowchart in time series, and they can includes processing performed in parallel or individually (for example, parallel processing or processing by an object.

It is preferable that the program is processed by one computer or distributive processing is performed by plural computers. Furthermore, it is preferable that the program is executed being transferred to a distant computer.

It should be noted that embodiments of the invention are not limited to the above embodiments, and various alternation may occur within a range not departing from the gist of the invention.

What is claimed is:

1. An information processing apparatus, comprising:
    an image taking means for taking images of a subject;
    a class-classification means for classifying a first image outputted by the image taking means into a class according to a characteristic thereof;
    a storage means for storing plural coefficient memories having corresponding to different image taking conditions at the time of image taking, which store noise removal prediction coefficients according to the class acquired by learning,
    a designation means for designating one coefficient memory from among the plural coefficient memories based on the image taking condition when the image was taken by the image taking means, and
    a calculation means for calculating a second image in which noise is removed from the first image by calculating using a noise removal prediction coefficient of the class of the first image, which is in the designated coefficient memory, wherein the second image includes an amount of pixels equal to an amount of pixels included in the first image.

2. The information processing apparatus according to claim 1, wherein the image taking condition is luminance or exposure time at the time of image taking.

3. The information processing apparatus according to claim 1,
- wherein the storage means further stores plural coefficient memories according to the image taking condition and unique information unique to the image taking means, and
- wherein the designation means designates the one coefficient memory from among the stored plural coefficient memories based on the image taking condition and the unique information.

4. The information processing apparatus according to claim 1,
- wherein the storage means further stores plural coefficient memories according to the image taking condition and defect position information indicating a position of a defective pixel in pixels included in the image taking means,
- wherein the designation means designates the one coefficient memory from among the stored plural coefficient memories based on the image taking condition and the defect position information, and
- wherein the calculation means corrects the defective pixels and calculates the second image in which noise is removed from the first image.

5. The information processing apparatus according to claim 1, further comprising:
- a defective pixel detection means for detecting a defective pixel of the image taking means and outputting defect position information; and
- a storage means for storing the defect position information.

6. The information processing apparatus according to claim 5,
- wherein the defective pixel detection means detects the defective pixel based on whether corresponding respective pixels of two images taken at different times have the same pixel value or not.

7. The information processing apparatus according to claim 1,
- wherein all components of the image taking means, the class-classification means, the storage means, the designation means, and the calculation means, or a part of the above components including at least the image taking means are implemented by a chip.

8. A computer implemented information processing method, implemented on an information processing apparatus, comprising:
- classifying, with a processor at the information processing apparatus, a first image obtained by taking images of a subject into a class according to a characteristic thereof;
- designating one coefficient memory from among plural coefficient memories corresponding to different image taking conditions at the time of image taking, which store noise removal prediction coefficients according to the class obtained by learning, based on the image taking condition when the first image was obtained; and
- calculating a second image in which noise is removed from the first image by calculating using a noise removal prediction coefficient of the class of the first image, which is in the designated coefficient memory, wherein the second image includes an amount of pixels equal to an amount of pixels included in the first image.

9. A non-transitory computer readable storage medium for storing therein a computer program that includes instructions which when executed on a computer causes the computer to execute a method comprising:
- classifying a first image obtained by taking images of a subject into a class according to a characteristic thereof;
- designating one coefficient memory from among plural coefficient memories corresponding to different image taking conditions at the time of image taking, which store noise removal prediction coefficients according to the class obtained by learning based on the image taking condition when the first image was obtained; and
- calculating a second image in which noise is removed from the first image by calculating using a noise removal prediction coefficient of the class of the first image, which is in the designated coefficient memory, wherein the second image includes an amount of pixels equal to an amount of pixels included in the first image.

10. A learning apparatus for learning a prediction coefficient used when performing noise removal processing of an taken image which is the taken image, comprising:
- a condition decision means for deciding an image taking condition;
- an image taking means for taking images of a subject under the decided image taking condition;
- a noise image generating means for generating noise images including noise extracted from images taken by the image taking means by calculating differences between an image which is an average value of plural images taken by the image taking means and respective plural images taken by the image taking means;
- a teacher image generating means for generating a teacher image to be a target image after the noise removal processing;
- a student image generating means for generating a student image corresponding to the taken image before the noise removal processing is performed by adding the noise image to the teacher image; and
- a storage means for storing data of pairs of the teacher image and the student image according to different image taking conditions.

11. The learning apparatus according to claim 10, further comprising:
- an extraction means for extracting plural pixels used for calculating a focused pixel which is a pixel of the teacher image from the student image with respect to respective image taking conditions; and
- a calculation means for calculating a prediction coefficient which allows a prediction error of the focused pixel calculated by using the prediction coefficient to be statistically minimum based on the extracted plural pixels.

12. A computer implemented learning method, implemented on a learning apparatus, for learning a prediction coefficient used for performing noise removal processing of a taken image which is the taken image, comprising:
- deciding, with a processor at the learning apparatus, the image taking condition;
- taking images of a subject under the decided image taking condition;
- generating a noise image including noise extracted from a taken image by calculating a difference between an image which is an average value of plural images taken in the taking step and the taken image;
- generating a teacher image to be a target image after noise removal processing;
- generating a student image corresponding to the taken image before the noise removal processing is performed by adding the noise image to the teacher image; and
- storing data of pairs of the teacher image and the student image according to different image taking conditions.

13. A non-transitory computer readable storage medium for storing therein a computer program that includes instructions for learning a prediction coefficient used for performing noise removal processing of a taken image which is the taken image, which when executed on a computer causes the computer to execute a method comprising:

deciding the image taking condition;

taking images of a subject under the decided image taking condition;

generating a noise image including noise extracted from a taken image by calculating a difference between an image which is an average value of plural images taken in the taking step and the taken image;

generating a teacher image to be a target image after noise removal processing;

generating a student image corresponding to the taken image before the noise removal processing is performed by adding the noise image to the teacher image; and storing data of pairs of the teacher image and the student image according to different image taking conditions.

14. An information processing apparatus, comprising:

an image taking unit configured to take images of a subject;

a class-classification unit configured to classify a first image outputted by the image taking unit into a class according to a characteristic thereof;

a storage unit configured to store plural coefficient memories corresponding to different image taking conditions at the time of image taking, which store noise removal prediction coefficients according to the class acquired by learning, a designation unit configured to designate one coefficient memory from among the plural coefficient memories based on the image taking condition when the image was taken by the image taking unit, and a calculation unit configured to calculate a second image in which noise is removed from the first image by calculating using a noise removal prediction coefficient of the class of the first image, which is in the designated coefficient memory, wherein the second image includes an amount of pixels equal to an amount of pixels included in the first image.

15. A learning apparatus for learning a prediction coefficient used when performing noise removal processing of an taken image which is the taken image, comprising:

a condition decision unit configured to decide an image taking condition;

an image taking unit configured to take images of a subject under the decided image taking condition;

an image generating unit configured to generate an image having reduced noise by averaging a plurality of taken images;

a noise image generating unit configured to generate noise images including noise extracted from images taken by the image taking unit by calculating differences between an image which is an average value of plural images taken by the image taking unit and respective plural images taken by the image taking unit;

a teacher image generating unit configured to generate a teacher image to be a target image after the noise removal processing;

a student image generating unit configured to generate a student image corresponding to the taken image before the noise removal processing is performed by adding the noise image to the teacher image; and a storage unit configured to store data of pairs of the teacher image and the student image according to different image taking conditions.

* * * * *